United States Patent [19]
Sueyoshi

[11] Patent Number: 5,585,922
[45] Date of Patent: Dec. 17, 1996

[54] DUAL INTERFEROMETER APPARATUS COMPENSATING FOR ENVIRONMENTAL TURBULENCE OR FLUCTUATION AND FOR QUANTIZATION ERROR

[75] Inventor: Masafumi Sueyoshi, Tokyo, Japan

[73] Assignee: Nikon Corporation, Tokyo, Japan

[21] Appl. No.: 532,267

[22] Filed: Sep. 22, 1995

Related U.S. Application Data

[63] Continuation of Ser. No. 165,823, Dec. 14, 1993, abandoned.

[30] Foreign Application Priority Data

| Dec. 24, 1992 | [JP] | Japan | 4-088317 U |
| Aug. 31, 1993 | [JP] | Japan | 5-047343 U |
| Oct. 1, 1993 | [JP] | Japan | 5-247165 |
| Dec. 3, 1993 | [JP] | Japan | 5-064782 U |
| Dec. 3, 1993 | [JP] | Japan | 5-303641 |

[51] Int. Cl.[6] .................................................. G01B 9/02
[52] U.S. Cl. .................................... 356/358; 356/361
[58] Field of Search ................................ 356/345, 349, 356/351, 357–358, 360, 361

[56] References Cited

U.S. PATENT DOCUMENTS

| 3,877,813 | 4/1975 | Hayes | 356/5 |
| 4,215,938 | 8/1980 | Farrand et al. | 356/358 |
| 4,813,783 | 3/1989 | Tonge | 356/358 |
| 4,948,254 | 9/1990 | Ishida | 356/358 |
| 4,984,891 | 1/1991 | Miyazaki et al. | 356/358 |
| 4,984,898 | 1/1991 | Höfler et al. | 356/358 |
| 5,280,341 | 1/1994 | Nonnenmacher et al. | 356/358 |
| 5,313,271 | 5/1994 | Chaney | 356/358 |
| 5,404,222 | 4/1995 | Lis | 356/349 |

FOREIGN PATENT DOCUMENTS

| 60-225005 | 11/1985 | Japan . |
| 60-263801 | 12/1985 | Japan . |

Primary Examiner—Frank Gonzalez
Assistant Examiner—Jason D. Eisenberg
Attorney, Agent, or Firm—Shapiro and Shapiro

[57] ABSTRACT

In this invention, in order to realize an interferometer apparatus which can correct a measurement error caused by a change in refractive index due to a fluctuation of a gas such as air with high precision, and can assure a high-precision, stable measurement, first and second interferometer means are arranged, and two measurement reflection means are integrally moved while a predetermined relationship is held between measurement optical path lengths and reference optical path lengths formed by the two interferometer means.

12 Claims, 13 Drawing Sheets

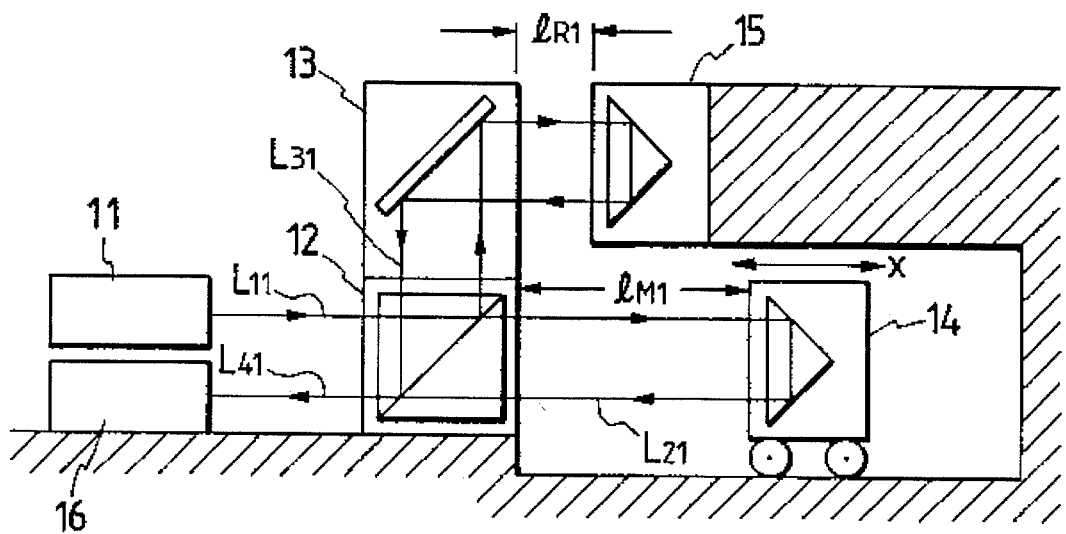
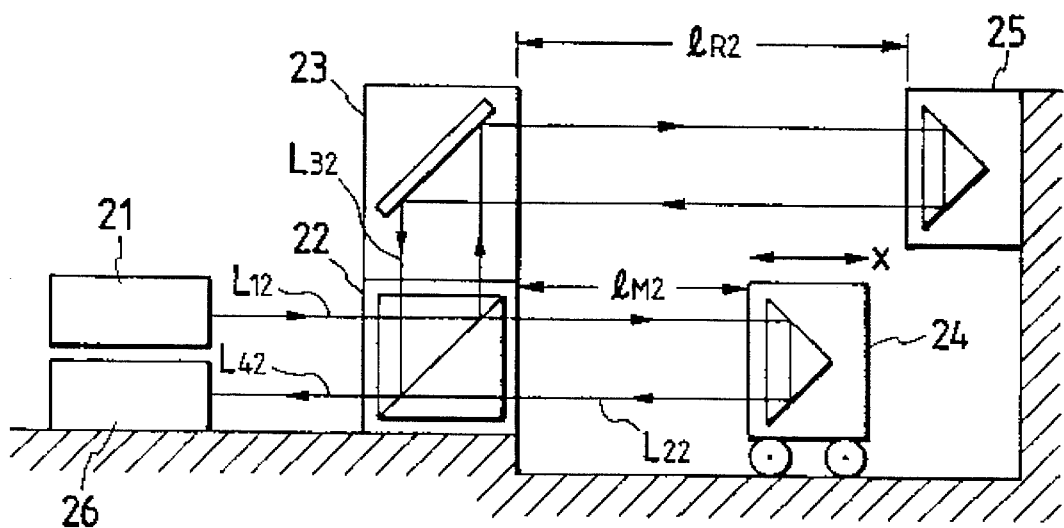

DUAL INTERFEROMETER APPARATUS COMPENSATING FOR ENVIRONMENTAL TURBULENCE OR FLUCTUATION AND FOR QUANTIZATION ERROR

This is a continuation of application Ser. No. 08/165,823 filed Dec. 14, 1993, now abandoned.

BACKGROUND OF THE INVENTION

1. Field of the Invention

The present invention relates to an interferometer apparatus which can correct a measurement error caused by a fluctuation or turbulence of air caused by an environmental change, i.e., a change in refractive index of air.

2. Related Background Art

Conventionally, a measurement error, which is caused by a change in refractive index of air due to an environmental change, and is included in a measurement value associated with the displacement amount or position of an object to be measured obtained from an interferometer apparatus, is corrected by measuring the temperature, pressure, humidity, and the like of air near a measurement beam which travels to and from the object to be measured using environment measurement sensors, and by executing a predetermined calculation based on the measured values from the environment measurement sensors and the measured value of the object to be measured by the measurement beam.

Also, as a conventional interferometer apparatus which corrects a change in refractive index of air as one of environmental changes, for example, Japanese Laid-Open Patent Application No. 60-263801 is known. In an apparatus disclosed in Japanese Laid-Open Patent Application No. 60-263801, as shown in FIG. 1, a laser beam emitted from a laser source 31 is split into two beams by a beam splitter 32. One beam $L_2$ transmitted through the beam splitter 32 is reflected, as a measurement beam, by a measurement-side reflection member 34 which is arranged to be movable in the right-and-left direction in FIG. 1, and propagates toward the beam splitter 32 again. On the other hand, the other beam $L_3$ reflected by the beam splitter 32 is reflected, as a reference beam, by a reference-side reflection member 35, fixed to a base, via a reflection mirror 33, and propagates toward the beam splitter 32 again via the reflection mirror 33. The beam splitter 32 combines the measurement beam L2 and the reference beam $L_3$ to be a beam $L_4$, and the beam $L_4$ is received by a photo-electric detector 36. Thus, the moving amount of the reflection member 34 as an object to be measured can be detected.

In this apparatus, the influence caused by a fluctuation of air is corrected by arranging the measurement- and reference-side reflection members 33 and 34 at almost equal positions, so that the reference- and measurement-optical path lengths in a portion influenced by the fluctuation of air become equal to each other.

However, in the conventional apparatus shown in FIG. 1, when the reflection member 34 as the object to be measured largely moves, the optical path difference between the measurement and reference beams $L_2$ and $L_3$ increases. As a result, since a measurement error becomes too large to be ignored, the influence of a change in refractive index of air caused by, e.g., a fluctuation of air cannot be fundamentally eliminated.

U.S. Pat. No. 4,984,891 proposes an interferometer apparatus which is not influenced by a change in refractive index of air, as shown in FIGS. 2A to 2C. FIG. 2A is a side view showing the arrangement of an interferometer apparatus, FIG. 2B is a plan view when FIG. 2A is viewed from the top, and FIG. 2C is a side view when FIG. 2A is viewed from the left side of the plane of the drawing.

This apparatus will be described below with reference to FIGS. 2A to 2C. A movable mirror 106 is fixed to one end of a stage ST which mounts, e.g., a wafer W as an object to be measured. The movable mirror 106 has first and second reflection surfaces 106a and 106b, which are arranged to be separated by a predetermined distance $l_2$ along the measurement direction.

A laser beam emitted from a laser source 101 is incident on a beam-splitting prism 102 in which a semi-transparent surface BS is formed on a joint surface between two prisms (102a and 102b), and is split by the beam-splitting surface BS into two beams in the vertical direction.

A laser beam reflected by the beam-splitting surface BS is incident on an upper portion of a polarization prism 103 via a reflection surface R formed on one surface of the semi-transparent prism 102, and a laser beam transmitted through the beam-splitting surface BS is incident on a lower portion of the polarization prism 103. The polarization prism 103 is constituted by joining two rectangular prisms, and a polarization splitting surface PBS is formed on the joint surface.

The laser beams incident on the upper and lower portions of the polarization prism 103 are polarized and split by the polarization splitting surface PBS in the polarization prism 103 into reference and measurement beams. More specifically, the polarization splitting surface PBS allows p-polarized light components, which oscillate in a direction parallel to the plane of the drawing of FIG. 2B, to pass therethrough as a reference beam, and reflects s-polarized light components, which oscillate in a direction perpendicular to the plane of the drawing of FIG. 2B, as a measurement beam.

The reference beams transmitted through the polarization splitting surface PBS pass through a quarterwave plate 104a joined to the exit surface (one surface of a rectangular prism 103b) of the polarization prism 103, are reflected by a reference reflection mirror 105 arranged at the end face of the quarterwave plate 104a, pass through the quarterwave plate 104a again, and propagate toward the polarization splitting surface PBS. At this time, since the reference beams reciprocally pass through the quarterwave plate 104a, the plane of polarization is rotated through 90°, and these beams are converted into s-polarized light beams. Therefore, the reference beams are reflected by the polarization splitting surface PBS, and propagate toward a polarization plate 107 joined to the exit side of the polarization prism 103.

On the other hand, the measurement beams reflected by the polarization splitting surface PBS pass through a quarterwave plate 104b joined to the exit-side surface (one surface of a rectangular prism 103a) of the polarization prism 103, and propagate toward the reflection mirror 106 fixed to one end of the stage ST. As shown in FIG. 2A, a first measurement beam, which is reflected by the upper portion of the polarization splitting surface PBS in the polarization prism 103, and passes through the upper portion of the quarterwave plate 104b, is reflected by the first reflection surface 106a as the upper portion of the reflection mirror 106, passes the quarterwave plate 104b again, and propagates toward the polarization splitting surface PBS. At this time, since the measurement beams reciprocally pass through the quarterwave plate 104b, the plane of polarization thereof is rotated through 90°, and the beams are converted into p-polarized light beams. Therefore, the measurement beams are transmitted through the polarization splitting surface PBS, and propagate toward the polarization plate 107 joined to the exit side of the polarization prism 103.

As described above, the measurement and reference beams, which pass through the upper portion of the polarization splitting surface PBS and propagate toward the polarization plate 107, pass through the polarization plate 107 and interfere with each other. Based on the interference light, a first optical path difference measuring device 108a generates an output A associated with the displacement amount of the first reflection surface 106a as the upper portion of the reflection mirror 106. Also, the measurement and reference beams, which pass through the lower portion of the polarization splitting surface PBS and propagate toward the polarization plate 107, pass through the polarization plate 107 and interfere with each other. Based on the interference light, a second optical path difference measuring device 108b generates an output B associated with the displacement amount of the second reflection surface 106b as the lower portion of the reflection mirror 106.

The two outputs from the optical path difference measuring devices (108a and 108b) are input to a calculator 109, and are used in a predetermined calculation. If the output A from the first optical path difference measuring device 108a is represented by $X_A$, the output B from the second optical path difference measuring device 108b is represented by $X_B$, the displacement amount of the stage ST is represented by x, the refractive index of air at the origin (at the beginning of measurement or upon resetting) of measurement where the displacement amount is zero is represented by n, a change in refractive index of air caused by, e.g., a fluctuation of air is represented by $\Delta n$, the distance in air between the second reflection surface 106b and the quarterwave plate 104b (or interferometer) is represented by $l_1$, and the distance in air between the first reflection surface 106a and the second reflection surface 106b is represented by $l_2$, the two outputs ($X_A$ and $X_B$) from the optical path difference measuring devices (108a and 108b) are respectively given by formulas (1) below:

$$X_A = xn + (l_1 + l_2 + x)\Delta n$$

$$X_B = xn + (l_1 + x)\Delta n \quad (1)$$

Also, the calculation formula in the calculator 109 is given by formula (2) below by eliminating $\Delta n$ from two formulas (1):

$$x = \frac{l_2 X_B - l_1 (X_A - X_B)}{l_2 n + X_A - X_B} \quad (2)$$

When the calculation given by formula (2) is executed by the calculator 109, an output result, which is free from the influence of the change in refractive index of air, is generated, and a high-precision position measurement of the stage ST is realized.

However, the prior art shown in FIGS. 2A to 2C suffers a fatal problem that errors of two interferometer apparatuses themselves are amplified in principle. When the distance $l_2$ between the two reflection surfaces formed on one end on the stage as an object to be measured is decreased, precision capable of compensating for a change in refractive index of air caused by, e.g., a fluctuation of air is decreased.

It is, therefore, an object of the present invention to provide an interferometer apparatus, which can solve the problems of the above-mentioned conventional apparatuses, can precisely correct a measurement error caused by a change in refractive index due to a fluctuation of a gas such as air, and always allows high-precision, stable measurements.

SUMMARY OF THE INVENTION

In order to achieve the above object, an interferometer apparatus according to one aspect of the present invention comprises:

first and second measurement reflection units which are arranged to be integrally movable in a measurement direction;

first and second reference reflection units respectively fixed at predetermined positions and a light source system for supplying a light beam;

a first interferometer system for forming, based on a light beam from the light source system, a first measurement optical path which reciprocates via the first measurement reflection unit, and a first reference optical path which reciprocates via the first reference reflection unit, and generating a first measurement output based on light beams obtained via the first measurement optical path and the first reference optical path;

a second interferometer system for forming, based on a light beam from the light source system, a second measurement optical path which reciprocates via the second measurement reflection unit, and a second reference optical path which reciprocates via the second reference reflection unit, and generating a second measurement output based on the basis of light beams obtained via the second measurement optical path and the second reference optical path; and calculator for performing a predetermined calculation based on the first and second measurement outputs, wherein when an optical path length of the first measurement optical path from the first interferometer system to a reference position of the first measurement reflection unit is represented by $l_{M1}$, an optical path length of the second measurement optical path from the second interferometer system to a reference position of the second measurement reflection unit is represented by $l_{M2}$, an optical path length of the first reference optical path from the first interferometer system to the first reference reflection unit is represented by $l_{R1}$, an optical path length of the second reference optical path from the second interferometer system to the second reference reflection unit is represented by $l_{R2}$, and a displacement of each of the first and second measurement reflection units from the reference positions thereof is represented by x, the first and second measurement reflection units are arranged to be movable within at least a range given by the following relation or within at least a portion of the range given by the following relation:

$$l_{R1} - l_{M1} \leq x \leq l_{R2} - l_{M2}$$

An interferometer apparatus according to another aspect of the present invention comprises:

first and second measurement reflection units which are arranged to be integrally movable in a measurement direction;

first and second reference reflection units respectively fixed at predetermined positions and a light source system for supplying light beams;

a first interferometer system for forming, based on a light beam from the light source system, a first measurement optical path which reciprocates via the first measurement reflection units, and a first reference optical path which reciprocates via the first reference reflection unit, and generating a first measurement output based on light beams obtained via the first measurement optical path and the first reference optical path;

a second interferometer system for forming, based on a light beam from the light source system, a second measurement optical path which reciprocates via the second measurement reflection unit, and a second reference optical path which reciprocates via the second reference reflection unit, and generating a second measurement output based on light beams obtained via the second measurement optical path and the second reference optical path; and calculator for performing a predetermined calculation based on the first and second measurement outputs, wherein when an optical path length of the first measurement optical path from the first interferometer system to a reference position of the first measurement reflection unit is represented by $l_{M1}$, an optical path length of the second measurement optical path from the second interferometer system to a reference position of the second measurement reflection unit is represented by $l_{M2}$, an optical path length of the first reference optical path from the first interferometer system to the first reference reflection unit is represented by $l_{R1}$, an optical path length of the second reference optical path from the second interferometer system to the second reference reflection unit is represented by $l_{R2}$, and a displacement of each of the first and second measurement reflection units from the reference positions thereof is represented by x, the first and second measurement reflection units are arranged to be movable within at least a range given by the following relation or within at least a portion of the range given by the following relation:

$$\frac{-5(l_{M1}-l_{R1})+3(l_{M2}-l_{R2})}{2} \leq x \leq \frac{3(l_{M1}-l_{R1})-5(l_{M2}-l_{R2})}{2}$$

An interferometer apparatus according to still another aspect of the present invention comprises:

first and second measurement reflection units which are arranged to be integrally movable in a measurement direction;

first and second reference reflection units respectively fixed at predetermined positions and a light source system for supplying light beams;

a first interferometer system for forming, based on a light beam from the light source system, a first measurement optical path which reciprocates via the first measurement reflection unit, and a first reference optical path which reciprocates via the first reference reflection unit, and generating a first measurement output based on light beams obtained via the first measurement optical path and the first reference optical path;

second interferometer means for forming, based on a light beam from the light source system, a second measurement optical path which reciprocates via the second measurement reflection unit, and a second reference optical path which reciprocates via the second reference reflection unit, and generating a second measurement output based on light beams obtained via the second measurement optical path and the second reference optical path; and calculator for performing a predetermined calculation based on the first and second measurement outputs, wherein when an optical path length of the first measurement optical path from the first interferometer system to a reference position of the first measurement reflection unit is represented by $l_{M1}$, an optical path length of the second measurement optical path from the second interferometer system to a reference position of the second measurement reflection unit is represented by $l_{M2}$, an optical path length of the first reference optical path from the first interferometer system to the first reference reflection unit is represented by $l_{R1}$, an optical path length of the second reference optical path from the second interferometer system to the second reference reflection unit is represented by $l_{R2}$, and a displacement of each of the first and second measurement reflection unit from the reference positions thereof is represented by x, the first and second measurement reflection units are arranged to be movable within at least a range given by the following relation $$-2(l_{M1}-l_{R1})+l_{M2}-l_{R2} \leq x \leq l_{M1}-l_{R1}-2(l_{M2}-l_{R2})$$

As described above, according to the present invention, a high-performance interferometer apparatus which causes a very small measurement error even when a fluctuation of a gas such as air occurs, and can attain high-precision measurement in principle, can be realized.

Other objects, features, and effects of the present invention will sufficiently become apparent from the following detailed description taken in conjunction with the accompanying drawings.

BRIEF DESCRIPTION OF THE DRAWINGS

FIG. 2A is viewed from the top;

FIG. 2B is viewed from the left side;

FIG. 4A is a schematic view of a first interferometer to show the basic principle of the present invention;

FIG. 4B is a schematic view of a second interferometer to show the basic principle of the present invention;

DESCRIPTION OF THE PREFERRED EMBODIMENTS

In order to allow easy understanding of the present invention, a mechanism for generating a measurement error in the conventional interferometer apparatus shown in FIGS. 2A to 2C will be described in detail below.

Figure 1:
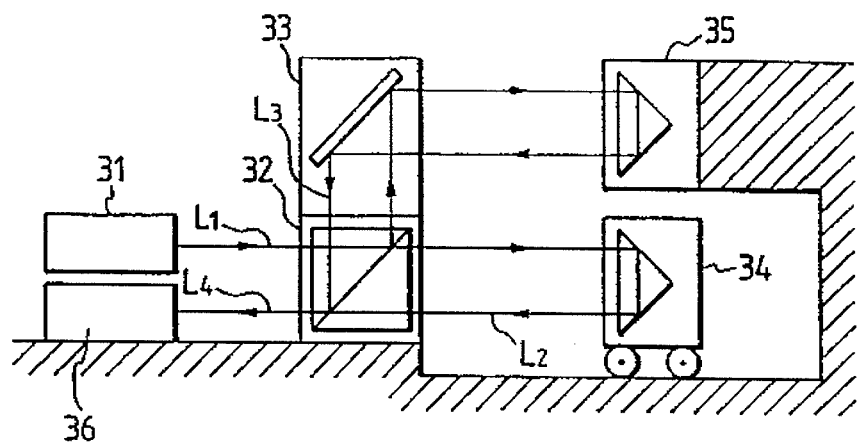
FIG. 1 is a schematic view showing the arrangement of a conventional interferometer apparatus disclosed in Japanese Laid-Open Patent Application No. 60-263801.
Figure 2A:
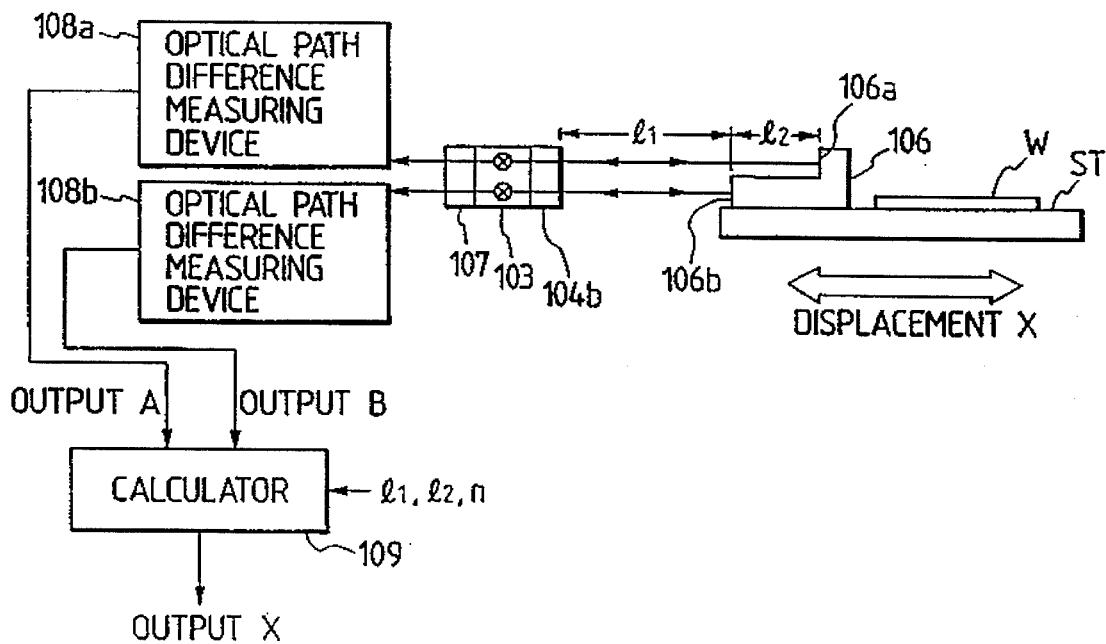
FIG. 2A is a side view showing a state wherein a conventional interferometer apparatus disclosed in U.S. Pat. No. 4,984,891 is viewed from one side.
Figure 2B:
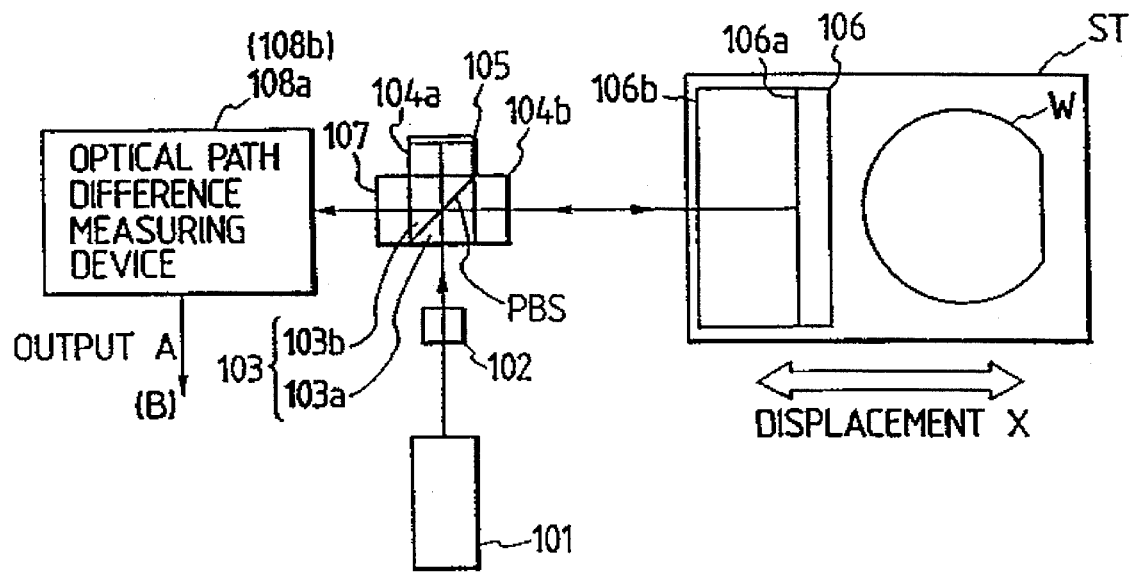
FIG. 2B is a plan view showing a state of the conventional interferometer apparatus when
Figure 2C:
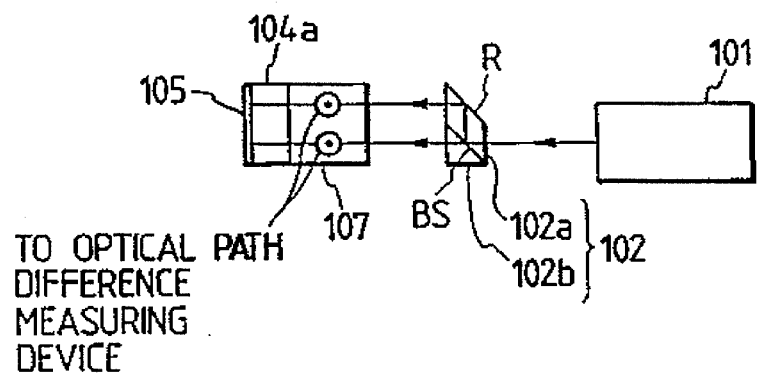
FIG. 2C is a side view showing a state of the conventional interferometer apparatus when

When a quantization error (or resolution) of a first interferometer apparatus (the upper portion of the polarization prism 103, the upper portions of the quarterwave plates 104a and 104b, the upper portion of the polarization plate 107, and the first optical path difference measuring device 108a shown in FIG. 2A) for forming a first measurement optical path which reciprocally passes through the first reflection surface 106a as the upper portion of the reflection mirror 106, and a first reference optical path which reciprocally passes through the upper portion of the reflection mirror 105, and generating a first measurement output A on the basis of light beams obtained via these two optical paths is represented by $\delta_A$, and a quantization error (or resolution) of a second interferometer apparatus (the lower portion of the polarization prism 103, the lower portions of the quarterwave plates 104a and 104b, the lower portion of the polarization plate 107, and the second optical path difference measuring device 108b shown in FIG. 2A) for forming a second measurement optical path which reciprocally passes through the second reflection surface 106b as the lower portion of the reflection mirror 106, and a second reference optical path which reciprocally passes through the lower portion of the reflection mirror 105, and generating a second measurement output B on the basis of light beams obtained via these two optical paths is represented by $\delta_B$, the measurement output A from the first interferometer apparatus shown in FIG. 2A equals a sum of the original measurement signal $X_A$ and the quantization error $\delta_A$, and the measurement output B from the second interferometer apparatus shown in FIG. 2A equals a sum of the original measurement signal $X_B$ and the quantization error $\delta_B$.

Thus, if an error amount added to the measurement result by the quantization errors of the interferometer apparatuses is represented by $\Delta x$, formula (2) above is rewritten as formula (3) below:

$$x + \Delta x = \frac{l_2(X_B + \delta_B) - l_1(X_A + \delta_A - X_B - \delta_B)}{l_2 n + X_A + \delta_A - X_B - \delta_B} \quad (3)$$

Formula (3) above can be modified as formula (4) below:

$$x + \Delta x = \frac{l_2 X_B - l_1(X_A - X_B) + l_2 \delta_B - l_1(\delta_A - \delta_B)}{l_2 n + X_A - X_B} \times \quad (4)$$

$$\left( \frac{1}{1 + \frac{\delta_A - \delta_B}{l_2 n + X_A - X_B}} \right)$$

$$\approx \left( x + \frac{l_2 \delta_B - l_1(\delta_A - \delta_B)}{l_2 n + X_A - X_B} \right) \times \left( 1 - \frac{\delta_A - \delta_B}{l_2 n + X_A - X_B} \right)$$

$$\approx x - \frac{\delta_A - \delta_B}{l_2 n + X_A - X_B} x + \frac{l_2 \delta_B - l_1(\delta_A - \delta_B)}{l_2 n + X_A - X_B}$$

In this case, since the outputs from the first and second interferometer apparatuses are given by $X_A = xn + (l_1 + l_2 + x)\Delta n$ and $X_B = xn + (l_1 + x)\Delta n$, as shown in formulas (1) above, formula (5) below can be derived from these relations and formula (4):

$$\Delta x = -\frac{\delta_A - \delta_B}{l_2(n + \Delta n)} x + \frac{l_2 \delta_B - l_1(\delta_A - \delta_B)}{l_2(n + \Delta n)} \quad (5)$$

If $n+\Delta n \equiv 1$, formula (5) above can be finally rewritten as formula (6) below:

$$\Delta x = \frac{1}{l_2}(-(\delta_A - \delta_B)x + l_2\delta_B - l_1(\delta_A - \delta_B)) \qquad (6)$$

$$= \frac{1}{l_2}(-(l_1+x)\delta_A + (l_1+l_2+x)\delta_B)$$

A maximum value $\Delta x_{MAX}$ of the quantization error $\Delta x$ will be examined below based on formula (6). If the maximum and minimum values of quantization errors ($\delta_A$, $\delta_B$,) of the first and second interferometer apparatuses are respectively represented by e and −e, and the quantization errors of the interferometer apparatuses can satisfy ranges of $-e \leq \delta_A \leq e$ and $-e \leq \delta_B \leq e$, a maximum value $|\Delta x_{MAX}|$ of the quantization error by formula (6) above is calculated.

As is apparent from FIG. 2A, since $l_1 > 0$, $l_2 > 0$, and $x \geq -l_1$ are satisfied, $(x+l_1+l_2)$ and $(x+l_1)$ in formula (6) always become positive.

Therefore, the maximum value $|\Delta x_{MAX}|$ of the quantization error by formula (6) above is finally given by formula (7) below:

$$|\Delta x_{MAX}| = \frac{1}{l_2}((x+l_1+l_2)e - (x+l_1)(-e)) \qquad (7)$$

$$= \frac{e}{l_2}(2x+2l_1+l_2)$$

Figure 3:
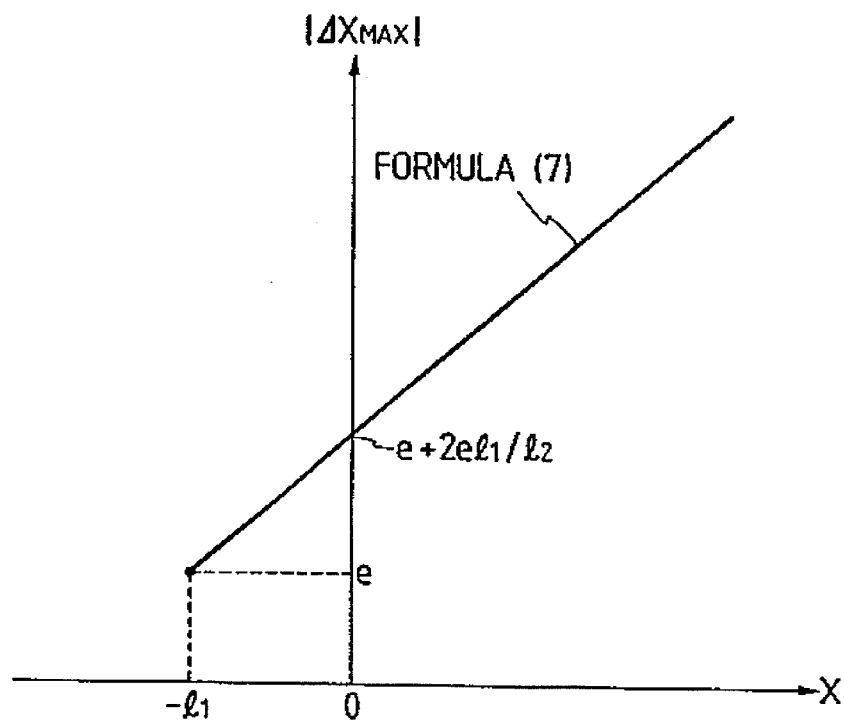
FIG. 3 is a graph showing the relationship between the maximum value of a quantization error and the moving amount of a stage in the conventional interferometer apparatus shown in FIGS. 2A to 2C.

When the maximum value $|\Delta x_{MAX}|$ of the quantization error given by formula (7) is plotted along the ordinate, and the position x of the stage ST is plotted along the abscissa, a graph shown in FIG. 3 is obtained.

As can be understood from FIG. 3, as the stage ST is located at a position separated farther from the first and second interferometers (quarterwave plate 104a), the maximum value $|\Delta x_{MAX}|$ of the quantization error increases, and a measurement error caused by the quantization error is too large to be ignored.

For example, if $l_1=0.3$ m, $l_2=0.1$ m, and the moving range of the stage ST is defined by $-0.3$ m $\leq x \leq 0.3$ m, the maximum value $|\Delta x_{MAX}|$ of the quantization error is maximized when the distances from the first and second interferometers (quarterwave plate 104a) to the second reflection surface 106b as the lower portion of the reflection mirror 106 are 0.6 m (x=0.3 m). The maximum value of the quantization error at this time is given by formula (8) below from formula (7) above:

$$|\Delta x_{MAX}|=13\ e \qquad (8)$$

Therefore, from formula (8), if the quantization errors e of the first and second interferometer apparatuses are about 10 nm, a measurement error as large as 130 nm is added to the finally obtained measurement value.

Also, as can be understood from formula (8), when the distance $l_2$ between the two reflection surfaces (106a and 106b) in the reflection mirror 106 arranged at one end on the stage as an object to be measured is decreased, the maximum value $|\Delta x_{MAX}|$ of the quantization error increases.

This fact will be explained in detail below. If the maximum value of the quantization error when $l_2'=l_2/2$ is represented by $|\Delta x_{MAX}|'$, this quantization error is expressed by formula (9) below on the basis of formula (7) above:

$$|\Delta x_{MAX}|' = \frac{e}{l_2'}(2x+2l_1+l_2') \qquad (9)$$

$$= \frac{2e}{l_2}(2x+2l_1+l_2/2)$$

$$= 2|\Delta x_{MAX}| - e$$

For example, as described above, when $l_1=0.3$ m, $l_2=0.1$ m, and the moving range of the stage ST is defined by $-0.3$ m $\leq x \leq 0.3$ m, if the value $l_2$ is set to be 0.05 m as a half of 0.1 m, the maximum value $|\Delta x_{MAX}|'$ of the quantization error is maximized when the stage ST is located at a position where the distances from the first and second interferometers (quarterwave plate 104a) to the second reflection surface 106b as the lower portion of the reflection mirror 106 are 0.6 m (x=0.3 m). The maximum value $|\Delta x_{MAX}|'$ of the quantization error at this time is expressed by formula (10) below on the basis of formulas (8) and (9) above:

$$|\Delta x_{MAX}|'=25\ e \qquad (10)$$

Therefore, from formulas (8) and (10), when the distance $l_2$ between the two reflection surfaces (106a and 106b) in the reflection mirror 106 formed at one end on the stage as an object to be measured is halved, the maximum value of the quantization error is almost doubled (increased $|\Delta x_{MAX}|'/|\Delta x_{MAX}|$ times). For this reason, from formula (10), if the quantization errors e of the first and second interferometer apparatuses are about 10 nm, a measurement error as large as about 250 nm is added to the finally obtained measurement value.

In order to solve the fatal problems of the conventional interferometer apparatus described above, the present invention pays attention to a mechanism in that two measurement reflection units are integrally moved while measurement optical path lengths and reference optical path lengths formed by two interferometer systems satisfy at least a predetermined relationship.

Thus, even when a change in refractive index occurs in reference and measurement optical paths passing through a gas such as air, two different measurement outputs including information of the change in refractive index of a gas such as air caused by an environmental change are obtained, and a predetermined calculation is performed based on these two measurement outputs, thereby eliminating a measurement error caused by the change in refractive index in each optical path. In addition, when the two measurement reflection units are arranged to be movable at least within a predetermined range or a portion of the range, the influence caused by the quantization errors of the two interferometer systems themselves can be remarkably eliminated, thus greatly improving measurement precision.

When a local change in refractive index in a gas such as air may occur in and near the measurement optical paths formed by the interferometer systems, the interferometer systems preferably form reference and measurement optical paths to be adjacent to each other.

The basic principle of the present invention will be described below with reference to FIGS. 4A and 4B. FIG. 4A shows the arrangement of a first interferometer apparatus (system) of the present invention, and FIG. 4B shows the arrangement of a second interferometer apparatus (system) of the present invention, sometimes referred to herein merely as first and second interferometers.

As shown in FIG. 4A, a light beam supplied from a first light source 11 is split into two beams by a beam splitter 12 as a beam-splitting member. One beam $L_{21}$ transmitted through the beam splitter 12 is reflected, as a measurement beam, by a measurement reflection member 14 (measurement reflection unit) which is arranged to be movable in the right-and-left direction in FIG. 4A, and propagates toward the beam splitter 12 again. On the other hand, the other beam $L_{31}$ reflected by the beam splitter 12 is reflected, as a reference beam, by a reflection mirror 13, and propagates in a gas such as air adjacent to the optical path of the measurement beam $L_{21}$ to be parallel to the measurement beam $L_{21}$. Thereafter, the beam $L_{31}$ is reflected by a reference reflection member 15 (first reference reflection unit) fixed to a base, propagates again in a gas such as air adjacent to the optical path of the measurement beam $L_{21}$ to be parallel to the measurement beam $L_{21}$, and is reflected by the reflection mirror 13 toward the beam splitter 12. The beam splitter 12 combines the measurement and reference beams $L_{21}$ and $L_{31}$ to be a beam $L_{41}$, and the beam $L_{41}$ is received by a first receiver 16 (first detector), thus detecting the moving amount of the reflection member 14 as an object to be measured.

The first interferometer shown in FIG. 4A is constituted by the beam splitter 12, the reflection mirror 13, and the first receiver 16, and the reference reflection member 15 is fixed to the base to be separated by a predetermined optical distance $l_{R1}$ from the first interferometer so as to obtain an optical path length $l_{R1}$ of a reference optical path in a gas. The measurement reflection member 14 is movably set to have an optical path length $l_{M1}$ of a measurement optical path in a gas at its reference position, so that an optical distance from the first interferometer to the reference position of the measurement reflection member 14 is $l_{M1}$.

In a direction perpendicular to the plane of the drawing of FIG. 4A, a second interferometer apparatus shown in FIG. 4B is arranged parallel to the first interferometer apparatus. In the second interferometer apparatus, a reflection mirror 23 and a reference reflection member 25 are respectively fixed, so that an optical path length $l_{R2}$ of a reference optical path in a gas of the second interferometer is different from the optical path length $l_{R1}$ of the reference optical path in a gas of the first interferometer. A beam splitter and a measurement reflection member 24 (measurement reflection unit) are respectively set, so that an optical path length $l_{M2}$ of a measurement optical path in a gas of the second interferometer is different from the optical path length $l_{M1}$ of the measurement optical path of the first interferometer at the reference position of the reflection member 24, or so that the optical path length $l_{M2}$ of the measurement optical path in a gas of the second interferometer is substantially equal to the optical path length $l_{M1}$ of the measurement optical path of the first interferometer at the reference position of the reflection member 24. Other arrangements are the basically the same as those of the first interferometer apparatus shown in FIG. 4A.

As shown in FIG. 4B, a light beam supplied from a second light source 21 is split into two beams by the beam splitter as a beam splitting member. One beam $L_{22}$ transmitted through the beam splitter 22 propagates toward the measurement reflection member 24 (measurement reflection unit) as a measurement beam. The reflection member 24 is joined to have the same displacement as that of the reflection member 14 shown in FIG. 4A, and is movably arranged in the right-and-left direction in FIG. 4B as in the reflection member 14. The beam $L_{22}$ propagating toward the measurement reflection member 24 is reflected by the reflection member 24, and propagates toward the beam splitter 22 again. On the other hand, the other beam $L_{32}$ reflected by the beam splitter 22 is reflected, as a reference beam, by a reflection mirror 23, and propagates in a gas such as air adjacent to the optical path of the measurement beam $L_{22}$ to be parallel to the measurement beam $L_{22}$. Thereafter, the beam $L_{32}$ is reflected by the reference reflection member 25 (second reference reflection unit) fixed to a base, propagates again in a gas such as air adjacent to the optical path of the measurement beam $L_{22}$ to be parallel to the measurement beam $L_{22}$, and is reflected by the reflection mirror 23 toward the beam splitter 22. The beam splitter 22 combines the measurement and reference beams $L_{22}$ and $L_{32}$ to be a beam $L_{42}$, and the beam $L_{42}$ is received by a second receiver 26 (second detector), thus detecting the moving amount of the reflection member 24 as an object to be measured.

Note that the second interferometer system shown in FIG. 4B is constituted by the beam splitter 22, the reflection mirror 23, and the second receiver 26.

With the above-mentioned arrangement, when the reflection members 14 and 24 acting as an object to be measured are integrally moved in directions parallel to the planes of the drawing of FIGS. 4A and 4B, the first receiver 16 of the first interferometer apparatus and the second receiver 26 of the second interferometer apparatus output two different detection signals. Assume that the output from the first receiver 16 of the first interferometer apparatus is represented by $X_A$, the output from the second receiver 26 of the second interferometer apparatus is represented by $X_B$, the refractive index of a gas as a reference in an initial state such as a state at the beginning of measurement (upon resetting) is represented by n, the change in refractive index from the refractive index of the reference gas in the initial state such as a state at the beginning of measurement (upon resetting) is represented by Δn, the length of an optical path in a portion influenced by the change in refractive index of the gas in the reference optical path of the first interferometer (i.e., the optical path length of a first reference optical path between the first interferometer and the first reference reflection unit) is represented by $l_{R1}$, the length of an optical path of a portion influenced by the change in refractive index of the gas in the reference optical path of the second interferometer (i.e., the optical path length of a second reference optical path between the second interferometer and the second reference reflection unit) is represented by $l_{R2}$, the length of an optical path of a portion influenced by the change in refractive index of the gas in the measurement optical path of the first interferometer at the reference position of the measurement reflection unit in the initial state such as a state at the beginning of measurement (upon resetting) (i.e., the optical path length of a first measurement optical path between the first interferometer and the reference position of the measurement reflection unit) is represented by $l_{M1}$, the length of an optical path of a portion influenced by the change in refractive index of the gas in the measurement optical path of the second interferometer at the reference position of the measurement reflection means in the initial state such as a state at the beginning of measurement (upon resetting) (i.e., the optical path length of a second measurement optical path between the second interferometer and the reference position of the measurement reflection unit) is represented by $l_{M2}$, and the displacement from the reference position (origin) of an object to be measured (first and second measurement reflection units) obtained when the optical path lengths of the portions influenced by the refractive index of the gas in the first and second measurement optical paths respectively become $l_{M1}$ and $l_{M2}$ is represented by x. The displacement x assumes a positive value when the object to be measured moves to the right from the origin, and assumes a negative value when the object to be measured moves to the left from the origin.

The output $X_A$ from the first receiver 16 of the first interferometer apparatus includes information influenced by the change in refractive index of the gas by the length ($l_{R1}$) of the reference optical path exposed to the gas, and information influenced by the change in refractive index of the gas by the optical path length ($l_{M1}$+x) of the measurement optical path exposed to the gas.

On the other hand, the output $X_b$ from the second receiver 26 of the second interferometer apparatus includes information influenced by the change in refractive index of the gas by the length ($l_{R2}$) of the reference optical path exposed to the gas, and information influenced by the change in refractive index of the gas by the optical path length ($l_{M2}+x$) of the measurement optical path exposed to the gas.

Therefore, at this time, formulas (11) and (12) below are established:

$$X_A = xn + (l_{M1} + x - l_{R1})\Delta n \quad (11)$$

$$X_B = xn + (l_{M2} + x - l_{R2})\Delta n \quad (12)$$

Formula (13) below is derived from formulas (11) and (12):

$$x = \frac{(l_{M1} - l_{R1})X_B - (l_{M2} - l_{R2})X_A}{X_A - X_B + n[(l_{M1} - l_{R1}) - (l_{M2} - l_{R2})]} \quad (13)$$

If the error amount to be added to the measurement result due to the quantization errors of the interferometer apparatuses is represented by $\Delta x$, formula (14) below is obtained from formula (13) above:

$$x + \Delta x = \frac{(l_{M1} - l_{R1})(X_B + \delta_B) - (l_{M2} - l_{R2})(X_A + \delta_A)}{X_A + \delta_A - X_B - \delta_B + n[(l_{M1} - l_{R1}) - (l_{M2} - l_{R2})]} \quad (14)$$

When formula (14) above is modified, formula (15) is obtained:

$$x = \Delta x \approx x - \frac{\delta_A - \delta_B}{X_A - X_B + n[(l_{M1} - l_{R1}) - (l_{M2} - l_{R2})]} \, x + \frac{(l_{M1} - l_{R1})\delta_B - (l_{M2} - l_{R2})\delta_A}{X_A - X_B + n[(l_{M1} - l_{R1}) - (l_{M2} - l_{R2})]} \quad (15)$$

Then, from the relationship among formulas (11), (12), and (15), formula (16) below is derived:

$$\Delta x = -\frac{\delta_A - \delta_B}{[(l_{M1} - l_{R1}) - (l_{M2} - l_{R2})](n + \Delta n)} \, x + \frac{(l_{M1} - l_{R1})\delta_B - (l_{M2} - l_{R2})\delta_A}{[(l_{M1} - l_{R1}) - (l_{M2} - l_{R2})](n + \Delta n)} \quad (16)$$

If $n + \Delta n \cong 1$, and $(l_{M1} - l_{R1}) - (l_{M2} - l_{R2}) = \alpha$, formula (16) is finally rewritten as formula (17) below:

$$\Delta x = \frac{1}{\alpha}(-(l_{M2} - l_{R2} + x)\delta_A + (l_{M1} - l_{R1} + x)\delta_B) \quad (17)$$

Thus, the maximum value $\Delta x_{MAX}$ of the quantization error amount $\Delta x$ will be examined based on formula (17) above. Assuming that $\alpha > 0$, the maximum and minimum values of the quantization errors ($\delta_A$ and $\delta_B$) of the first and second interferometer apparatuses are respectively represented by $e$ and $-e$, and the quantization errors of the interferometer apparatuses fall within the ranges of $-e \leq \delta_A \leq e$ and $-e \leq \delta_B \leq e$, the maximum value $|\Delta x_{MAX}|$ of the quantization error given by formula (17) can be classified into the following three cases (i) to (iii).

(i) When $l_{R1} - l_{M1} \leq x \leq l_{R2} - l_{M2}$

In this case, $l_{M1} - l_{R1} + x \geq 0$ and $l_{M2} - l_{R2} + x \leq 0$ are satisfied, and the maximum value $|\Delta x_{MAX}|$ of the quantization error is expressed by formula (18) below from formula (17):

$$|\Delta x_{MAX}| = \frac{1}{\alpha}(-(l_{M2} - l_{R2} + x)e + (l_{M1} - l_{R1} + x)e) \quad (18)$$
$$= e$$

(ii) When $x > l_{R2} - l_{M2}$

In this case, $l_{M1} - l_{R1} + x \geq 0$ and $l_{M2} - l_{R2} + x \geq 0$ are satisfied, and the maximum value $|\Delta x_{MAX}|$ of the quantization error is expressed by formula (19) below from formula (17):

$$|\Delta x_{MAX}| = \frac{1}{\alpha}(-(l_{M2} - l_{R2} + x)(-e) + (l_{M1} - l_{R1} + x)e) \quad (19)$$
$$= \frac{e}{(l_{M1} - l_{R1}) - (l_{M2} - l_{R2})}(2x + l_{M2} - l_{R2} + l_{M1} - l_{R1})$$

(iii) When $x < l_{R1} - l_{M1}$

In this case, $l_{M1} - l_{R1} + x < 0$ and $l_{M2} - l_{R2} + x < 0$ are satisfied, and the maximum value $|\Delta x_{MAX}|$ of the quantization error is expressed by formula (20) below from formula (17):

$$|\Delta x_{MAX}| = \frac{1}{\alpha}(-(l_{M2} - l_{R2} + x)e + (l_{M1} - l_{R1} + x)(-e)) \quad (20)$$
$$= \frac{-e}{(l_{M1} - l_{R1}) - (l_{M2} - l_{R2})}(2x + l_{M2} - l_{R2} + l_{M1} - l_{R1})$$

Figure 5:
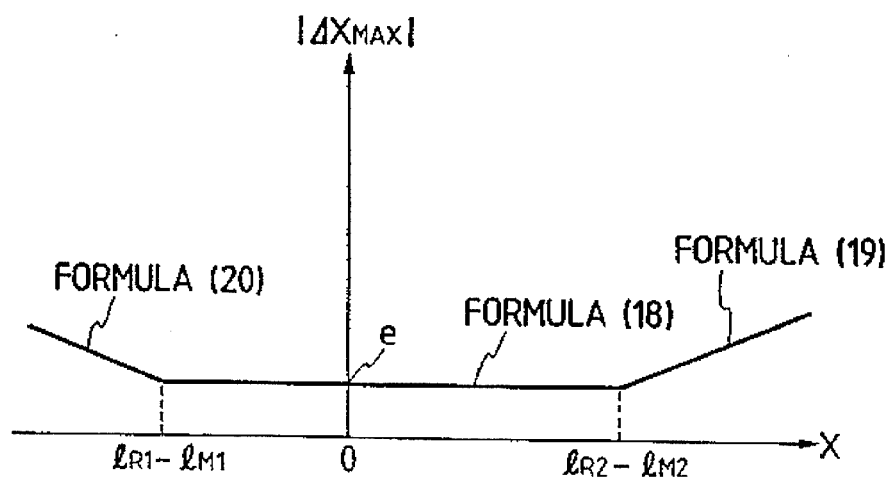
FIG. 5 is a graph showing the relationship between the maximum value of a quantization error and the position of an object to be measured in an interferometer apparatus based on the basic principle of the present invention shown in FIGS. 4A and 4B.

FIG. 5 is a graph obtained by plotting the maximum values $|\Delta x_{MAX}|$ of the quantization errors given by formulas (18) to (20) along the ordinate, and the position x of the stage ST along the abscissa.

Thus, an optimal moving range x of the measurement reflection members (14 and 24) for guaranteeing high precision of the interferometer apparatuses shown in FIGS. 4A and 4B as a whole will be examined below using formulas (18) to (20) above.

In order to guarantee high precision of the interferometer apparatuses while correcting the influence of a change in refractive index of a gas such as air due to, e.g., a fluctuation of the gas, in practice, it is preferable that the maximum value ($|\Delta x_{MAX}|$) of the quantization error to be added to the measurement output of each interferometer apparatus be suppressed to 4 e or less. Therefore, the optimal moving range x of the measurement reflection members (14 and 24) obtained when the quantization error e to be added to the measurement output of each interferometer apparatus is suppressed to ×4 to ×1 or less will be described below.

(I) When maximum value $|\Delta x_{MAX}|$ of quantization error is suppressed to 4 e or less In this case, the optimal moving range x (for $x \geq 0$) of the measurement reflection members (14 and 24) is expressed by formula (21) below from formulas (18) to (20) above:

$$\frac{-5(l_{M1} - l_{R1}) + 3(l_{M2} - l_{R2})}{2} \leq x \leq \frac{3(l_{M1} - l_{R1}) - 5(l_{M2} - l_{R2})}{2} \quad (21)$$

For example, the moving range x of the measurement reflection members (14 and 24), which range can suppress the maximum value ($|\Delta x_{MAX}|$) of the quantization errors to be added to the measurement outputs of the interferometer apparatuses to 4 e or less when the quantization error e (or resolution) of each of the first interferometer apparatus shown in FIG. 4A and the second interferometer apparatus shown in FIG. 4B is set to be 0.5 nm, and $l_{R1}=1.0$ m, $l_{R2}=1.5$ m, and $l_{M1}=l_{M2}=0.5$ m are set, or $l_{R1}=1.0$ m, $l_{R2}=1.5$ m, $l_{M1}=0.3$ m, and $l_{M2}=0.5$ m are set will be examined below.

When $l_{R1}=1.0$ m, $l_{R2}=1.5$ m, and $l_{M1}=l_{M2}=0.5$ m are set, as can be understood from formula (21) above, the moving range x of the measurement reflection members (14 and 24) corresponds to a range from $-0.25$ to $1.75$ m, and a wide measurement range can be assured while guaranteeing a precision of 2.0 nm ($=4$ e) in the interferometer apparatuses as a whole. When $l_{R1}=1.0$ m, $l_{R2}=1.5$ m, $l_{M1}=0.3$ m, and $l_{M2}=0.5$ m are set, as can be understood from formula (21) above, the moving range x of the measurement reflection members (14 and 24) corresponds to a range from $0.25$ to $1.45$ m, and a relatively wide measurement range can be assured while guaranteeing a precision of 2.0 nm ($=4$ e) in the interferometer apparatuses as a whole.

(II) When maximum value $|\Delta x_{MAX}|$ of quantization error is suppressed to 3 e or less In this case, the optimal moving range x (for $x \geq 0$) of the measurement reflection members (14 and 24) is expressed by formula (22) below from formulas (18) to (20) above:

$$-2(l_{M1}-l_{R1})+l_{M2}-l_{R2} \leq x \leq l_{M1}-l_{R1}-2(l_{M2}-l_{R2}) \quad (22)$$

For example, the moving range x of the measurement reflection members (14 and 24), which range can suppress the maximum value ($|\Delta x_{MAX}|$) of the quantization errors to be added to the measurement outputs of the interferometer apparatuses to 3 e or less when the quantization error e (or resolution) of each of the first interferometer apparatus shown in FIG. 4A and the second interferometer apparatus shown in FIG. 4B is set to be 0.5 nm, and $l_{R1}=1.0$ m, $l_{R2}=1.5$ m, and $l_{M1}=l_{M2}=1.25$ m are set, or $l_{R1}=1.0$ m, $l_{R2}=1.5$ m, $l_{M1}=2.0$ m, and $l_{M2}=1.5$ m are set will be examined below.

When $l_{R1}=1.0$ m, $l_{R2}=1.5$ m, and $l_{M1}=l_{M2}=1.25$ m are set, as can be understood from formula (22) above, the moving range x of the measurement reflection members (14 and 24) corresponds to a range from −0.75 to 0.75 m, and a wide measurement range can be assured while guaranteeing a precision of 1.5 nm (=3 e) in the interferometer apparatuses as a whole. When $l_{R1}=1.0$ m, $l_{R2}=1.5$ m, $l_{M1}=2.0$ m, and $l_{M2}=1.5$ m are set, as can be understood from formula (22) above, the moving range x of the measurement reflection members (14 and 24) corresponds to a range from −2.0 m to 1.0 m, and a relatively wide measurement range can be assured while guaranteeing a precision of 1,5 nm (=3 e) in the interferometer apparatuses as a whole.

(III) When maximum value $|\Delta x_{MAX}|$ of quantization error is suppressed to 2 e or less In this case, the optimal moving range x (for $x \geq 0$) of the measurement reflection members (14 and 24) is expressed by formula (23) below from formulas (18) to (20) above:

$$\frac{-3(l_{M1}-l_{R1})+l_{M2}-l_{R2}}{2} \leq x \leq \frac{l_{M1}-l_{R1}-3(l_{M2}-l_{R2})}{2} \quad (23)$$

For example, the moving range x of the measurement reflection members (14 and 24), which range can suppress the maximum value ($|\Delta x_{MAX}|$) of the quantization errors to be added to the measurement outputs of the interferometer apparatuses to 2 e or less when the quantization error e (or resolution) of each of the first interferometer apparatus shown in FIG. 4A and the second interferometer apparatus shown in FIG. 4B is set to be 0.5 nm, and $l_{R1}=1.0$ m, $l_{R2}=1.5$ m, and $l_{M1}=l_{M2}=2.0$ m are set, or $l_{R1}=1.0$ m, $l_{R2}=1.5$ m, $l_{M1}=1.75$ m, and $l_{M2}=2.0$ m are set will be examined below.

When $l_{R1}=1.0$ m, $l_{R2}=1.5$ m, and $l_{M1}=l_{M2}=2.0$ m are set, as can be understood from formula (23) above, the moving range x of the measurement reflection members (14 and 24) corresponds to a range from −1.25 to 0.25 m, and a wide measurement range can be assured while guaranteeing a precision of 1.0 nm (=2 e) in the interferometer apparatuses as a whole. When $l_{R1}=1.0$ m, $l_{R2}=1.5$ m, $l_{M1}=1.75$ m, and $l_{M2}=2.0$ m are set, as can be understood from formula (21) above, the moving range x of the measurement reflection members (14 and 24) corresponds to a range from −0.875 m to −0.375 m, and a relatively wide measurement range can be assured while guaranteeing a precision of 1.0 nm (=2 e) in the interferometer apparatuses as a whole.

(IV) When maximum value $|\Delta x_{MAX}|$ of quantization error is suppressed to e or less In this case, the optimal moving range x (for $x \geq 0$) of the measurement reflection members (14 and 24) is expressed by formula (24) below from formulas (18) to (20) above:

$$l_{R1}-l_{M1} \leq x \leq l_{R2}-l_{M2} \quad (24)$$

For example, the moving range x of the measurement reflection members (14 and 24), which range can suppress the maximum value ($|\Delta x_{MAX}|$) of the quantization errors to be added to the measurement outputs of the interferometer apparatuses to e or less when the quantization error e (or resolution) of each of the first interferometer apparatus shown in FIG. 4A and the second interferometer apparatus shown in FIG. 4B is set to be 0.5 nm, and $l_{R1}=0.5$ m, $l_{R2}=1.5$ m, and $l_{M1}=l_{M2}=1.0$ m are set, or $l_{R1}=1.0$ m, $l_{R2}=2.0$ m, $l_{M1}=2.0$ m, and $l_{M2}=1.5$ m are set will be examined below.

When $l_{R1}=0.5$ m, $l_{R2}=1.5$ m, and $l_{M1}=l_{M2}=1.0$ m are set, as can be understood from formula (24) above, the moving range x of the measurement reflection members (14 and 24) corresponds to a range from −0.5 m to 0.5 m, or when $l_{R1}=1.0$ m, $l_{R2}=2.0$ m, $l_{M1}=2.0$ m, and $l_{M2}=1.5$ m are set, as can be understood from formula (24) above, the moving range x of the measurement reflection members (14 and 24) corresponds to a range from −1.0 m to 0.5 m, and a wide measurement range can be assured while guaranteeing a precision of 0.5 nm (=e) in the interferometer apparatuses as a whole.

As can be understood from the above description, according to the present invention, a stable measurement can be realized with high precision even when the refractive index of the gas changes due to an environmental change. In addition, according to the present invention, when the object to be measured (first and second measurement reflection units) are moved within a range satisfying formula (24), in principle, the quantization errors e (or resolutions) of the two interferometers can be suppressed to ×1 or less, and a very stable, high-precision measurement can be attained. When a precision of ×1 or less of the quantization errors e (or resolutions) of the two interferometers is not required, the object to be measured (first and second measurement reflection units) need only be arranged to be movable within at least a range satisfying formula (24) above or a portion of the range.

In the above description, the basic principle of the present invention has been described. In order to allow easy understanding of the present invention, another principle (to be referred to as a first principle hereinafter) from a viewpoint different from the principle shown in FIGS. 4A and 4B in a case wherein the reference optical path lengths of the first and second interferometers are set to be different from each other, and the measurement optical path lengths of the first and second interferometers are set to be equal to each other, will be analyzed with reference to FIGS. 6A and 6B.

Figure 6A:
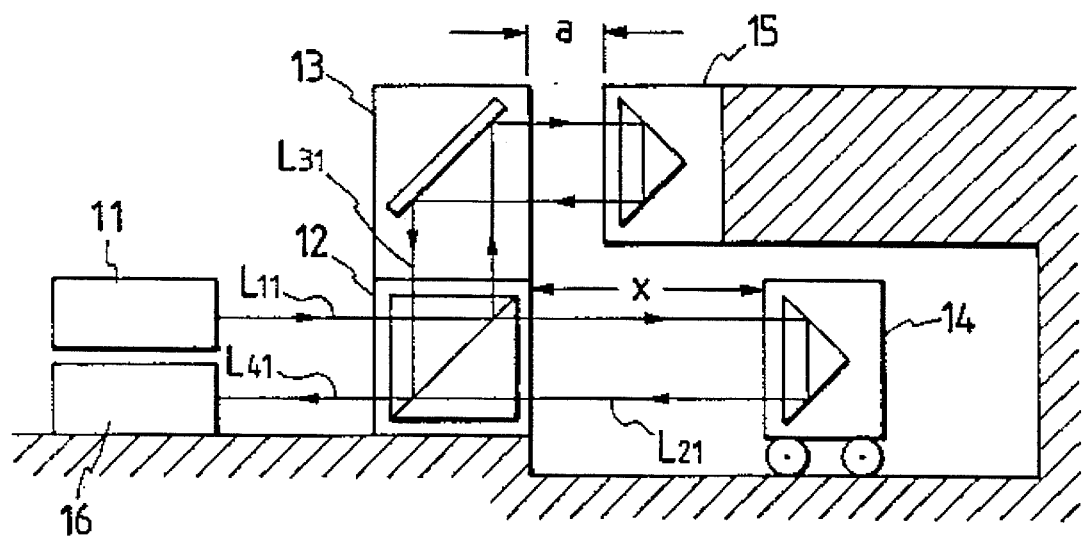
FIG. 6A is a schematic view of the first interferometer to show the first principle of the present invention when the reference optical path lengths of the first and second interferometers are set to be different from each other, and the measurement optical path lengths of the first and second interferometers are set to be equal to each other.
Figure 6B:
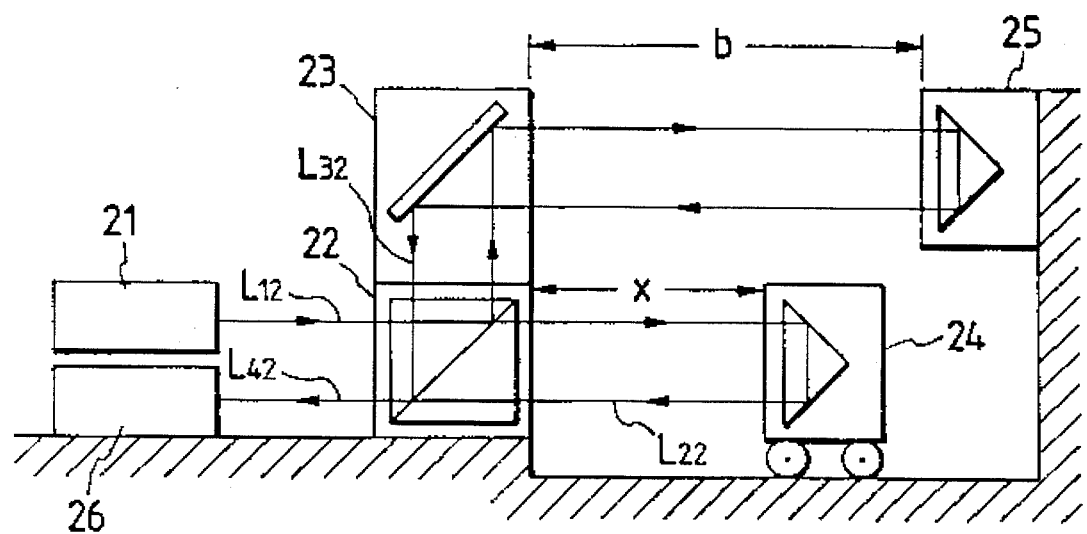
FIG. 6B is a schematic view of the second interferometer to show the first principle of the present invention when the reference optical path lengths of the first and second interferometers are set to be different from each other, and the measurement optical path lengths of the first and second interferometers are set to be equal to each other.

A case will be examined below wherein $l_{M1}=l_{M2}=0$, $l_{R1}=a$, $l_{R2}=b$, and the optical path length (or distance) from the first interferometer to the measurement reflection member 14 (or from the second interferometer to the measurement reflection member 24) is represented by x, as shown in FIGS. 6A and 6B.

In other words, assume that the output from the first receiver 16 of the first interferometer apparatus is represented by $X_A$, the output from the second receiver 26 of the second interferometer apparatus is represented by $X_B$, the refractive index of a gas as a reference in an initial state such as a state at the beginning of measurement (upon resetting) is represented by n, the length of an optical path in a portion influenced by the change in refractive index of the gas in the reference optical path of the first interferometer (i.e., the optical path length of a first reference optical path between the first interferometer and the first reference reflection units) is represented by a, the length of an optical path in a portion influenced by the change in refractive index of the gas in the reference optical path of the second interferometer (i.e., the optical path length of a second reference optical path between the second interferometer and the second reference reflection units) is represented by b, and the length of an optical path in a portion influenced by the change in refractive index of the measurement optical path of the first (or second) interferometer (i.e., the optical path length of a first measurement optical path between the first interferometer and the measurement reflection unit or the optical path length of a second measurement optical path between the second interferometer and the measurement reflection unit) is represented by x.

The output $X_A$ from the first receiver 16 of the first interferometer apparatus includes information influenced by the change in refractive index of the gas by the length a of the reference optical path exposed to the gas, and information influenced by the change in refractive index of the gas by the optical length x of the measurement optical path exposed to the gas.

On the other hand, the output $X_B$ from the second receiver 26 of the second interferometer apparatus includes information influenced by the change in refractive index of the gas by the length b of the reference optical path exposed to the gas, and information influenced by the change in refractive index of the gas by the optical length x of the measurement optical path exposed to the gas.

Therefore, it is desirable to average the outputs ($X_A$ and $X_B$) from the two receivers (16 and 26) at a ratio at which reference light and measurement light are equally influenced by the change in refractive index of the gas. At this time, the relations given by formulas (25) and (26) below are established:

$$ka + (1-k)b = x \qquad (25)$$

$$nx = kX_A + (1-k)X_B \qquad (26)$$

From formulas (25) and (26), formula (27) below is obtained:

$$x = \frac{aX_B - bX_A}{X_B - X_A + n(a-b)} \qquad (27)$$

Therefore, when the calculation means calculates formula (27) above using the outputs ($X_A$ and $X_B$) from the receivers (16 and 26), the influence of the change in refractive index of the gas can be eliminated.

Then, quantization errors caused by the interferometers of the present invention will be examined below. If the quantization error (or resolution) of the first interferometer apparatus is represented by $\delta_A$, and the quantization error (or resolution) of the second interferometer apparatus is represented by $\delta_B$, the measurement output from the first interferometer apparatus shown in FIG. 6A corresponds to a sum of the original measurement signal $X_A$ and the quantization error $\delta_A$, and the measurement output from the second interferometer apparatus shown in FIG. 6B corresponds to a sum of the original measurement signal $X_B$ and the quantization error $\delta_B$. Thus, if the error amount to be added to the measurement result due to the quantization errors of the interferometer apparatuses is represented by $\Delta x$, formula (27) above is rewritten as formula (28) below:

$$x + \Delta x = \frac{a(X_B + \delta_B) - b(X_A + \delta_A)}{(X_B + \delta_B) - (X_A + \delta_A) + n(a-b)} \qquad (28)$$

Formula (28) can be modified to be formula (29) below:

$$x + \Delta x = \frac{(aX_B - bX_A) + (a\delta_B - b\delta_A)}{n(a-b) + X_B - X_A} \times \left( \frac{1}{1 + \frac{\delta_B - \delta_A}{n(a-b) + X_B - X_A}} \right) \qquad (29)$$

$$\approx \left( x + \frac{a\delta_B - b\delta_A}{n(a-b) + X_B - X_A} \right) \times \left( 1 - \frac{\delta_B - \delta_A}{n(a-b) + X_B - X_A} \right)$$

$$\approx x - \frac{\delta_B - \delta_A}{n(a-b) + X_B - X_A} x + \frac{a\delta_B - b\delta_A}{n(a-b) + X_B - X_A}$$

Assuming that the reference and measurement optical paths of the first and second interferometer apparatuses shown in FIGS. 6A and 6B pass through air, and the refractive index of air is changed by $\Delta n$ due to, e.g., a fluctuation of air in the optical path lengths corresponding to the differences between the reference and measurement optical path lengths of the interferometer apparatuses, the outputs from the first and second interferometer apparatuses are respectively given by $X_A = (x-a)\Delta n$ and $X_B = (x-b)\Delta n$. Thus, from these relations and formula (29) above, formula (30) below is derived:

$$\Delta x = \frac{-(\delta_B - \delta_A)}{(a-b)(n+\Delta n)} x + \frac{a\delta_B - b\delta_A}{(a-b)(n+\Delta n)} \qquad (30)$$

If $n + \Delta n \cong 1$, formula (30) is finally rewritten as formula (31) below:

$$\Delta x = \frac{1}{(b-a)} ((x-a)\delta_B - (x-b)\delta_A) \qquad (31)$$

The maximum value $\Delta x_{MAX}$ of the quantization error amount $\Delta x$ will be examined below on the basis of formula (31) above. If the maximum and minimum values of the quantization errors ($\delta_A$ and $\delta_B$) of the first and second interferometer apparatuses are respectively represented by e and $-e$, and the quantization errors of the interferometer apparatuses respectively fall within the ranges of $-e \leq \delta_A \leq e$ and $-e \leq \delta_B \leq e$, the maximum value $|\Delta x_{MAX}|$ of the quantization error amount given by formula (31) can be classified into the following three cases (i) to (iii).

(i) When $a \leq x \leq b$ (for $a<b$)

When $a \leq x \leq b$, $x-a \geq 0$ and $x-b \leq 0$ are satisfied, and the maximum value $|\Delta x_{MAX}|$ of the quantization error amount is expressed by formula (32) below from formula (31):

$$|\Delta x_{MAX}| = \frac{1}{(b-a)} ((x-a)e - (x-b)e) \qquad (32)$$
$$= e$$

(ii) When $x > b$ (for $a<b$)

When $x > b$, $x-a > 0$ and $x-b > 0$ are satisfied, and the maximum value $|\Delta x_{MAX}|$ of the quantization error amount is expressed by formula (33) below from formula (31):

$$|\Delta x_{MAX}| = \frac{1}{(b-a)} ((x-a)e - (x-b)(-e)) \qquad (33)$$
$$= \frac{1}{(b-a)} (2ex - (a+b)e)$$

(iii) When $x < a$ (for $a<b$)

When $x < a$, $x-a < 0$ and $x-b < 0$ are satisfied, and the maximum value $|\Delta x_{MAX}|$ of the quantization error amount is expressed by formula (34) below from formula (31):

$$|\Delta x_{MAX}| = \frac{1}{(b-a)} ((x-a)(-e) - (x-b)e) \qquad (34)$$
$$= \frac{1}{(b-a)} (-2ex + (a+b)e)$$

Figure 7:
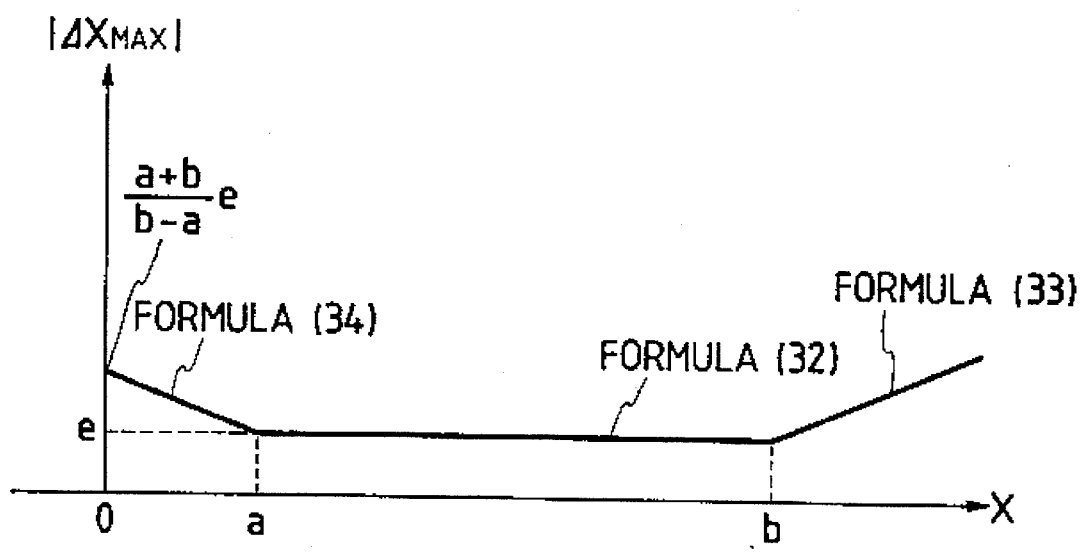
FIG. 7 is a graph showing the relationship between the maximum value of a quantization error and the position of an object to be measured in an interferometer apparatus based on the first principle of the present invention shown in FIGS. 6A and 6B.

FIG. 7 shows a graph obtained by plotting the maximum values $|\Delta x_{MAX}|$ of the quantization error amounts given by formulas (32) to (34) above along the ordinate, and the position x of the stage ST along the abscissa.

Thus, an optimal moving range x of the measurement reflection members (14 and 24) for guaranteeing high precision of the interferometer apparatuses shown in FIGS. 6A and 6B as a whole will be examined below using formulas (32) to (34) above.

In order to guarantee high precision of the interferometer apparatuses while correcting the influence of a change in refractive index of a gas such as air due to, e.g., a fluctuation of the gas, in practice, it is preferable that the maximum value ($|\Delta x_{MAX}|$) of the quantization error to be added to the measurement output of each interferometer apparatus be suppressed to 4 e or less. Therefore, the optimal moving range x of the measurement reflection members (14 and 24) obtained when the quantization error e to be added to the measurement output of each interferometer apparatus is suppressed to ×4 to ×1 or less will be described below.

(I) When maximum value $|\Delta x_{MAX}|$ of quantization error is suppressed to 4 e or less In this case, the optimal moving range x (for $x \geq 0$) of the measurement reflection members (14 and 24) is expressed by formulas (35) or (36) below from formulas (32) to (34):

$$0 \leq x \leq \frac{5b-3a}{2}, 0 \leq a \leq \frac{3}{5} b \quad (35)$$

$$\frac{5b-3b}{2} \leq x \leq \frac{5b-3a}{2}, \frac{3}{5} b < a < b \quad (36)$$

If these relations given by formulas (35) and (36) are modified in correspondence with formula (21) above, the modified relations are equivalent to a case wherein the measurement optical path length $l_{M1}$ of the first interferometer and the measurement optical path length $l_{M2}$ of the second interferometer in formula (21) are set to be equal to each other (when $l_{M1}=l_{M2}=l_M$).

For example, the moving range x of the measurement reflection members (14 and 24), which range can suppress the maximum value ($|\Delta x_{MAX}|$) of the quantization errors to be added to the measurement outputs of the interferometer apparatuses to 4 e or less when the quantization error e (or resolution) of each of the first interferometer apparatus shown in FIG. 6A and the second interferometer apparatus shown in FIG. 6B is set to be 0.5 nm, and a=0.5 m and b=1.0 m are set, or a=0.7 m and b=1.0 m are set will be examined below.

When a=0.5 m and b=1.0 m are set, as can be understood from formulas (35) above, the moving range x of the measurement reflection members (14 and 24) corresponds to a range from 0 m to 1.75 m, and a wide measurement range can be assured while guaranteeing a precision of 2.0 nm (=4 e) in the interferometer apparatuses as a whole. When a=0.7 m and b=1.0 m are set, as can be understood from formulas (36) above, the moving range x of the measurement reflection members (14 and 24) corresponds to a range from 0.25 m to 1.45 m, and a relatively wide measurement range can be assured while guaranteeing a precision of 2.0 nm (=4 e) in the interferometer apparatuses as a whole.

(II) When maximum value $|\Delta x_{MAX}|$ of quantization error is suppressed to 3 e or less In this case, the optimal moving range x (for $x \geq 0$) of the measurement reflection members (14 and 24) is expressed by formulas (37) or (38) below from formulas (32) to (34):

$$0 \leq x \leq 2b-a, 0 \leq a \leq \frac{1}{2} b \quad (37)$$

$$2a-b \leq x \leq 2b-a, \frac{1}{2} b < a < b \quad (38)$$

If these relations given by formulas (37) and (38) are modified in correspondence with formula (22) above, the modified relations are equivalent to a case wherein the measurement optical path length $l_{M1}$ of the first interferometer and the measurement optical path length $l_{M2}$ of the second interferometer in formula (22) are set to be equal to each other (when $l_{M1}=l_{M2}=l_M$).

For example, the moving range x of the measurement reflection members (14 and 24), which range can suppress the maximum value ($|\Delta x_{MAX}|$) of the quantization errors to be added to the measurement outputs of the interferometer apparatuses to 3 e or less when the quantization error e (or resolution) of each of the first interferometer apparatus shown in FIG. 6A and the second interferometer apparatus shown in FIG. 6B is set to be 0.5 nm, and a=0.4 m and b=1.0 m are set, or a=0.6 m and b=1.0 m are set will be examined below.

When a=0.4 m and b=1.0 m are set, as can be understood from formulas (37) above, the moving range x of the measurement reflection members (14 and 24) corresponds to a range from 0 m to 1.6 m, and a wide measurement range can be assured while guaranteeing a precision of 1.5 nm (=3 e) in the interferometer apparatuses as a whole. When a=0.6 m and b=1.0 m are set, as can be understood from formulas (38) above, the moving range x of the measurement reflection members (14 and 24) corresponds to a range from 0.2 m to 1.4 m, and a relatively wide measurement range can be assured while guaranteeing a precision of 1.5 nm (=3 e) in the interferometer apparatuses as a whole.

(III) When maximum value $|\Delta x_{MAX}|$ of quantization error is suppressed to 2 e or less In this case, the optimal moving range x (for $x \geq 0$) of the measurement reflection members (14 and 24) is expressed by formulas (39) or (40) below from formulas (32) to (34):

$$0 \leq x \leq \frac{3b-a}{2}, 0 \leq a \leq \frac{1}{3} b \quad (39)$$

$$\frac{3a-b}{2} \leq x \leq \frac{3b-a}{2}, \frac{1}{3} b < a < b \quad (40)$$

If these relations given by formulas (39) and (40) are modified in correspondence with formula (23) above, the modified relations are equivalent to a case wherein the measurement optical path length $l_{M1}$ of the first interferometer and the measurement optical path length $l_{M2}$ of the second interferometer in formula (23) are set to be equal to each other (when $l_{M1}=l_{M2}=l_M$).

For example, the moving range x of the measurement reflection members (14 and 24), which range can suppress the maximum value ($|\Delta x_{MAX}|$) of the quantization errors to be added to the measurement outputs of the interferometer apparatuses to 2 e or less when the quantization error e (or resolution) of each of the first interferometer apparatus shown in FIG. 6A and the second interferometer apparatus shown in FIG. 6B is set to be 0.5 nm, and a=0.2 m and b=1.0 m are set, or a=0.5 m and b=1.0 m are set will be examined below.

When a=0.2 m and b=1.0 m are set, as can be understood from formulas (39) above, the moving range x of the measurement reflection members (14 and 24) corresponds to a range from 0 m to 1.4 m, and a wide measurement range can be assured while guaranteeing a precision of 1.0 nm (=2 e) in the interferometer apparatuses as a whole. When a=0.5 m and b=1.0 m are set, as can be understood from formulas (40) above, the moving range x of the measurement reflection members (14 and 24) corresponds to a range from 0.25 m to 1.25 m, and a relatively wide measurement range can be assured while guaranteeing a precision of 1.0 nm (=2 e) in the interferometer apparatuses as a whole.

(IV) When maximum value $|\Delta x_{MAX}|$ of quantization error is suppressed to e or less In this case, the optimal moving range x (for $x \geq 0$) of the measurement reflection members (14 and 24) is expressed by formulas (41) below from formulas (32) to (34):

$a \leqq x \leqq b, a \geqq 0, b > 0$ (41)

If the relation given by formulas (41) is modified in correspondence with formula (24) above, the modified relation is equivalent to a case wherein the measurement optical path length $l_{M1}$ of the first interferometer and the measurement optical path length $l_{M2}$ of the second interferometer in formula (24) are set to be equal to each other (when $l_{M1} = l_{M2} = l_M$).

For example, when the quantization error e (or resolution) of each of the first interferometer apparatus shown in FIG. 6A and the second interferometer apparatus shown in FIG. 6B is set to be 0.5 nm, and a=0.5 m and b=1.0 m are set, as can be understood from formulas (41) above, the moving range x of the measurement reflection members (14 and 24) corresponds to a range from 0.5 m to 1.0 m, and a wide measurement range can be assured while guaranteeing a precision of 0.5 nm (=e) in the interferometer apparatuses as a whole.

As can be understood from the above description, according to the present invention, a stable measurement can be realized with high precision even when the refractive index of the gas changes due to an environmental change. In addition, according to the present invention, since a wide measurement range x which can suppress the quantization error e (or resolution) of the first interferometer apparatus shown in FIG. 6A or the second interferometer apparatus shown in FIG. 6B to ×1 or less can be assured in principle, a very stable, high-precision measurement can be attained. Note that the coordinate origin according to the present invention can be set anywhere in principle as long as it falls within the moving range of the measurement reflection members (14 and 24).

In the above description, the first principle based on the basic principle of the present invention has been described. In order to allow easy understanding of the present invention, the second principle based on the basic principle of the present invention shown in FIGS. 4A and 4B in a case wherein the reference optical path lengths of the first and second interferometers are set to be equal to each other, and the measurement optical path lengths of the first and second interferometers are set to be different from each other will be analyzed below with reference to FIGS. 8A and 8B.

Figure 8A:
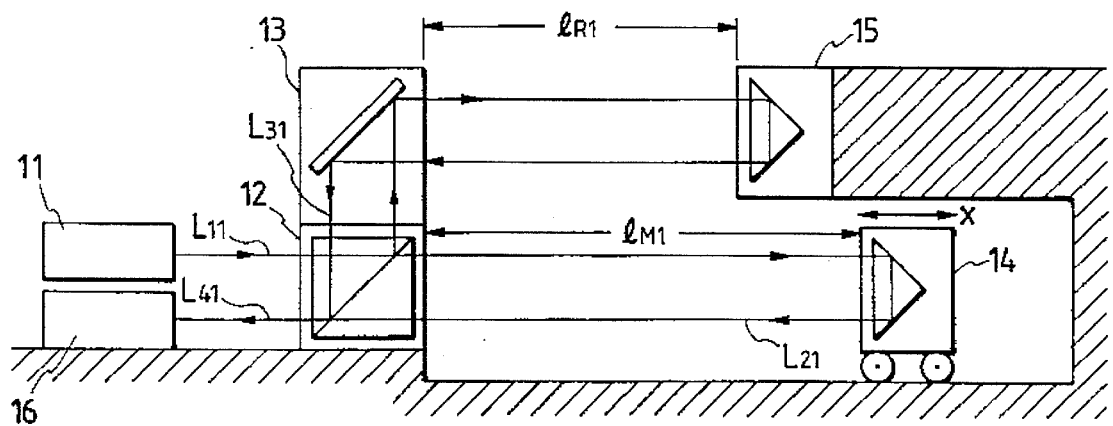
FIG. 8A is a schematic view of the first interferometer to show the second principle of the present invention when the measurement optical path lengths of the first and second interferometers are set to be different from each other, and the reference optical path lengths of the first and second interferometers are set to be equal to each other.
Figure 8B:
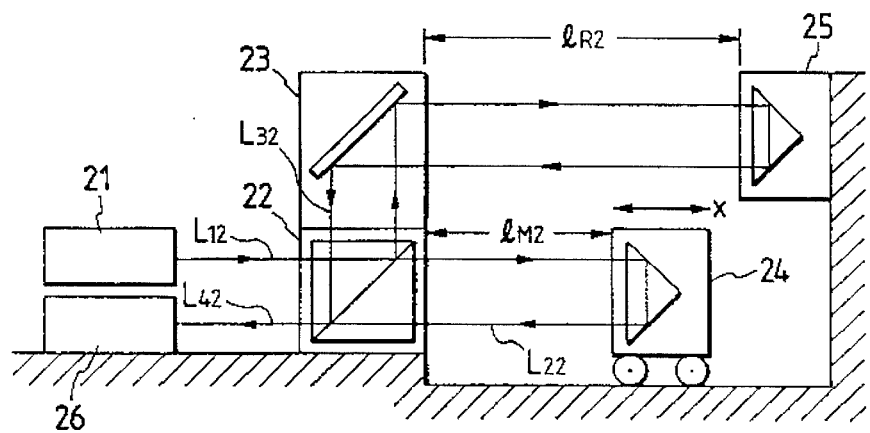
FIG. 8B is a schematic view of the second interferometer to show the second principle of the present invention when the measurement optical path lengths of the first and second interferometers are set to be different from each other, and the reference optical path lengths of the first and second interferometers are set to be equal to each other.

FIG. 8A shows the arrangement of the first interferometer apparatus of the present invention, and FIG. 8B shows the arrangement of the second interferometer apparatus of the present invention.

As shown in FIG. 8A, a light beam supplied from a first light source is split into two beams by a beam splitter 12 as a beam splitting member. One beam $L_{21}$ transmitted through the beam splitter 12 is reflected as a measurement beam by a measurement reflection member 14 (first measurement reflection unit) which is arranged to be movable in the right-and-left direction in FIG. 8A, and propagates toward the beam splitter 12 again. On the other hand, the other beam $L_{31}$ reflected by the beam splitter 12 is reflected as a reference beam by a reflection mirror 13, and propagates in a gas such as air adjacent to the optical path of the measurement beam $L_{21}$ to be parallel to the measurement beam $L_{21}$. Thereafter, the beam $L_{31}$ is reflected by a reference reflection member 15 (first reference reflection unit) fixed to a base, propagates again in a gas such as air adjacent to the optical path of the measurement beam $L_{21}$ to be parallel to the measurement beam $L_{21}$, and is reflected by the reflection mirror 13 toward the beam splitter 12. The beam splitter 12 combines the measurement and reference beams $L_{21}$ and $L_{31}$ to be a beam $L_{41}$, and the beam $L_{41}$ is received by a first receiver 16 (first detector), thus detecting the moving amount of the reflection member 14 as an object to be measured.

The first interferometer shown in FIG. 8A is constituted by the beam splitter 12, the reflection mirror 13, and the first receiver 16, and the reference reflection member 15 is fixed to the base to be separated by a predetermined optical distance $l_{R1}$ from the first interferometer, so that the optical path length of the reference optical path in the gas becomes $l_{R1}$. The measurement reflection member 14 is movably set to have an optical path length $l_{M1}$ of the measurement optical path in the gas at its reference position, and to have an optical distance $l_{M1}$ from the first interferometer to the reference position of the measurement reflection member 14.

In a direction perpendicular to the plane of the drawing of FIG. 8A, the second interferometer apparatus shown in FIG. 8B is arranged parallel to the first interferometer apparatus. In the second interferometer apparatus, a reflection mirror 23 and a reference reflection member 25 are respectively fixed, so that an optical path length $l_{R2}$ of the reference optical path in the gas of the second interferometer equals the optical path length $l_{R1}$ of the reference optical path in the gas of the first interferometer. A beam splitter 22 and a measurement reflection member 24 (measurement reflection unit) are respectively set, so that an optical path length $l_{M2}$ of the measurement optical path in the gas of the second interferometer is different from the optical path length $l_{M1}$ of the reference optical path in the gas of the second interferometer at the reference position of the reflection member 24. Other arrangements are basically the same as those of the first interferometer apparatus shown in FIG. 8A.

As shown in FIG. 8B, a light beam supplied from a second light source 21 is split into two beams by the beam splitter as a beam splitting member. One beam $L_{22}$ transmitted through the beam splitter 22 propagates toward the measurement reflection member 24 (second measurement reflection unit) as a measurement beam. The reflection member 24 is arranged to be movable in the right-and-left direction in FIG. 8B together with the reflection member 14 shown in FIG. 8A. The beam $L_{22}$ propagating toward the measurement reflection member 24 is reflected by the reflection member 24, and propagates toward the beam splitter 22 again. On the other hand, the other beam L32 reflected by the beam splitter 22 is reflected, as a reference beam, by the reflection mirror 23, and propagates in a gas such as air adjacent to the optical path of the measurement beam $L_{22}$ to be parallel to the measurement beam $L_{22}$. Thereafter, the beam $L_{32}$ is reflected by the reference reflection member 25 (second reference reflection unit) fixed to a base, propagates again in a gas such as air adjacent to the optical path of the measurement beam $L_{22}$ to be parallel to the measurement beam $L_{22}$, and is reflected by the reflection mirror 23 toward the beam splitter 22. The beam splitter 22 combines the measurement and reference beams $L_{22}$ and $L_{32}$ to be a beam $L_{42}$, and the beam $L_{42}$ is received by a second receiver 26 (second detector), thus detecting the moving amount of the reflection member 24 as an object to be measured.

Note that the second interferometer shown in FIG. 8B is constituted by the beam splitter 22, the reflection mirror 23, and the second receiver 26.

With the above-mentioned arrangement, when the reflection members 14 and 24 as an object to be measured are integrally moved in directions parallel to the planes of the drawing of FIGS. 8A and 8B, the first receiver 16 of the first interferometer apparatus and the second receiver 26 of the second interferometer apparatus output two different detection signals. Assume that the output from the first receiver 16 of the first interferometer apparatus is represented by $X_A$, the output from the second receiver 26 of the second interferometer apparatus is represented by $X_B$, the length of an optical path in a portion influenced by the change in refractive index of a gas in the reference optical path of the first interferometer (i.e., the optical path length in the gas of a first reference optical path between the first interferometer and the first reference reflection units) is represented by $l_{R1}$ ($=l_R$), the length of an optical path in a portion influenced by the change in refractive index of the gas in the reference optical path of the second interferometer (i.e., the optical path length in the gas of a second reference optical path between the second interferometer and the second reference reflection units) is represented by $l_{R2}$ ($=l_{R1}=l_R$), the length of a portion influenced by the change in refractive index of the gas in the measurement optical path of the first interferometer at the reference position of the measurement reflection means in an initial state such as a state at the beginning of measurement (upon resetting) (i.e., the optical path length of a first measurement optical path between the first interferometer and the reference position of the measurement reflection unit) is represented by $l_{M1}$, the length of a portion influenced by the change in refractive index of the gas in the measurement optical path of the second interferometer at the reference position of the measurement reflection units in an initial state such as a state at the beginning of measurement (upon resetting) (i.e., the optical path length of a second measurement optical path between the second interferometer and the reference position of the measurement reflection units) is represented by $l_{M2}$, and the displacement from the reference position (origin) of an object to be measured (first and second measurement reflection units) obtained when the optical path lengths of the portions influenced by the change in refractive index of the gas in the first and second measurement optical paths respectively become $l_{M1}$ and $l_{M2}$ is represented by x. The displacement x assumes a positive value when the object to be measured moves to the right from the origin, and assumes a negative value when the object to be measured moves to the left from the origin.

In the case of the second principle of the present invention as well, since the relations of formulas (11) and (12) above are established, the relation given by formula (16) above associated with the error amount $\Delta x$ to be added to the measurement results due to the quantization errors of the interferometer apparatuses is finally established. Therefore, when formula (16) is modified for $l_{R1}=l_{R2}=l_R$, formula (42) below is obtained:

$$\Delta x = -\frac{\delta_A - \delta_B}{[(l_{M1} - l_R) - (l_{M2} - l_R)](n + \Delta n)} x + \frac{(l_{M1} - l_R)\delta_B - (l_{M2} - l_R)\delta_A}{[(l_{M1} - l_R) - (l_{M2} - l_R)](n + \Delta n)} \quad (42)$$

If $n+\Delta n \equiv 1$, formula (42) is rewritten to obtain formula (43) below:

$$\Delta x = \frac{1}{l_{M1} - l_{M2}} (-(x + l_{M2} - l_R)\delta_A + (x + l_{M1} - l_R)\delta_B) \quad (43)$$

The maximum value $\Delta x_{MAX}$ of the quantization error $\Delta x$ will be examined below on the basis of formula (43). Assuming that the maximum and minimum values of the quantization errors ($\delta_A$ and $\delta_B$) of the first and second interferometer apparatuses are respectively represented by e and $-e$, and the quantization errors of the interferometer apparatuses fall within the ranges of $-e \leq \delta_A \leq e$ and $-e \leq \delta_B \leq e$, the maximum value $|\Delta x_{MAX}|$ of the quantization error given by formula (43) can be classified into the following three cases (i) to (iii).

(i) When $l_R - l_{M1} \leq x \leq l_R - l_{M2}$ (for $l_{M1} > l_{M2}$)

In this case, $x + l_{M1} - l_R \geq 0$ and $x + l_{M2} - l_R \leq 0$ are satisfied, and the maximum value $|\Delta x_{MAX}|$ of the quantization error is expressed by formula (44) below from formula (42) above:

$$|\Delta x_{MAX}| = \frac{1}{l_{M1} - l_{M2}} (-(x + l_{M2} - l_R)e + (x + l_{M1} - l_R)e) \quad (44)$$
$$= e$$

(ii) When $x > l_R - l_{M2}$ (for $l_{M1} > l_{M2}$)

In this case, $x + l_{M1} - l_R > 0$ and $x + l_{M2} - l_R > 0$ are satisfied, and the maximum value $|\Delta x_{MAX}|$ of the quantization error is expressed by formula (45) below from formula (43) above:

$$|\Delta x_{MAX}| = \frac{1}{l_{M1} - l_{M2}} (-(x + l_{M2} - l_R)(-e) + (x + l_{M1} - l_R)e) \quad (45)$$
$$= \frac{e}{l_{M1} - l_{M2}} (2x - 2l_R + l_{M1} + l_{M2})$$

(iii) When $x < l_R - l_{M2}$ (for $l_{M1} > l_{M2}$)

In this case, $x + l_{M1} - l_R < 0$ and $x + l_{M2} - l_R < 0$ are satisfied, and the maximum value $|\Delta x_{MAX}|$ of the quantization error is expressed by formula (46) below from formula (43) above:

$$|\Delta x_{MAX}| = \frac{1}{l_{M1} - l_{M2}} (-(x + l_{M2} - l_R)e + (x + l_{M1} - l_R)(-e)) \quad (46)$$
$$= \frac{e}{l_{M1} - l_{M2}} (-2x + 2l_R - l_{M1} - l_{M2})$$

Figure 9:
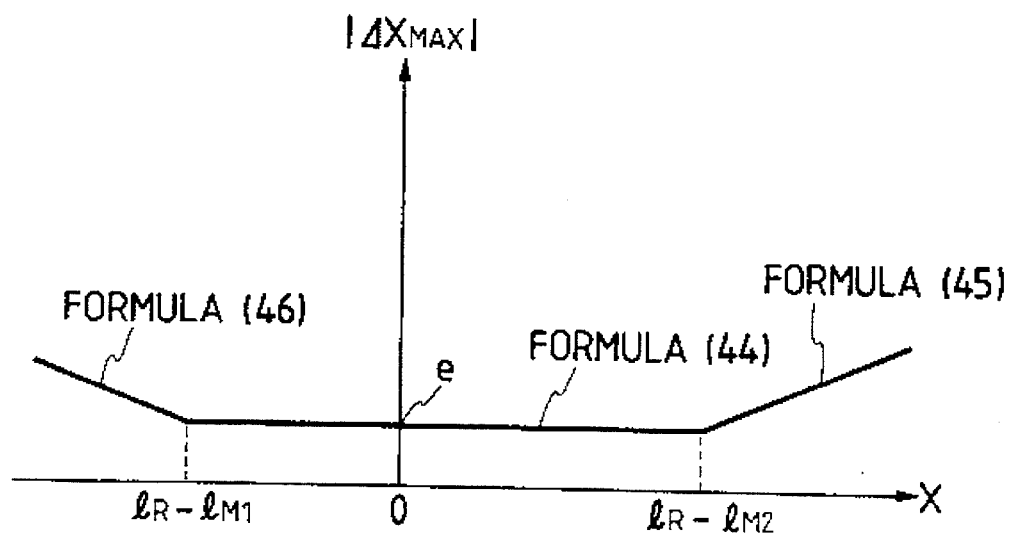
FIG. 9 is a graph showing the relationship between the maximum value of a quantization error and the position of an object to be measured in an interferometer apparatus based on the second principle of the present invention shown in FIGS. 8A and 8B.

FIG. 9 is a graph obtained by plotting the maximum values $|\Delta x_{MAX}|$ of the quantization errors given by formulas (44) to (46) along the ordinate, and the position x of the stage ST along the abscissa.

Thus, an optimal moving range x of the measurement reflection members (14 and 24) for guaranteeing high precision of the interferometer apparatuses shown in FIGS. 8A and 8B as a whole will be examined below using formulas (44) to (46) above.

In order to guarantee high precision of the interferometer apparatuses while correcting the influence of a change in refractive index of a gas such as air due to, e.g., a fluctuation of the gas, in practice, it is preferable that the maximum value ($|\Delta x_{MAX}|$) of the quantization error to be added to the measurement output of each interferometer apparatus be suppressed to 4 e or less. Therefore, the optimal moving range x of the measurement reflection members (14 and 24) obtained when the quantization error e to be added to the measurement output of each interferometer apparatus is suppressed to ×4 to ×1 or less will be described below.

(I) When maximum value $|\Delta x_{MAX}|$ of quantization error is suppressed to 4 e or less In this case, the optimal moving range x (for $x \geq -l_{M2}$) of the measurement reflection members (14 and 24) is expressed by formula (47) below from formulas (44) to (46) above:

$$\frac{-5l_{M1} + 3l_{M2} + 2l_R}{2} \leq x \leq \frac{3l_{M1} - 5l_{M2} + 2l_R}{2} \quad (47)$$

For example, the moving range x of the measurement reflection members (14 and 24), which range can suppress the maximum value ($|\Delta x_{MAX}|$) of the quantization errors to be added to the measurement outputs of the interferometer apparatuses to 4 e or less when the quantization error e (or resolution) of each of the first interferometer apparatus shown in FIG. 8A and the second interferometer apparatus shown in FIG. 8B is set to be 0.5 nm, and $l_{M1}$=0.7 m, $l_{M2}$=0.5 m, and $l_R=l_{R1}=l_{R2}$=0.6 m will be examined below.

In this case, as can be understood from formula (47), the moving range x of the measurement reflection members (14 and 24) corresponds to a range from −0.4 m to 0.4 m, and a precision of 2.0 nm (=4 e) is guaranteed in the interferometer apparatuses as a whole.

(II) When maximum value $|\Delta x_{MAX}|$ of quantization error is suppressed to 3 e or less In this case, the optimal moving range x (for $x \geq -l_{M2}$) of the measurement reflection members (14 and 24) is expressed by formula (48) below from formulas (44) to (46) above:

$$-2 l_{M1} + l_{M2} + l_R \leq x \leq l_{M1} - 2 l_{M2} + l_R \qquad (48)$$

For example, the moving range x of the measurement reflection members (14 and 24), which range can suppress the maximum value ($|\Delta x_{MAX}|$) of the quantization errors to be added to the measurement outputs of the interferometer apparatuses to 3 e or less when the quantization error e (or resolution) of each of the first interferometer apparatus shown in FIG. 8A and the second interferometer apparatus shown in FIG. 8B is set to be 0.5 nm, and $l_{M1}$=0.7 m, $l_{M2}$=0.5 m, and $l_R$=$l_{R1}$=$l_{R2}$=0.6 m will be examined below.

In this case, as can be understood from formula (48), the moving range x of the measurement reflection members (14 and 24) corresponds to a range from −0.3 m to 0.3 m, and a precision of 1.5 nm (=3 e) is guaranteed in the interferometer apparatuses as a whole.

(III) When maximum value $|\Delta x_{MAX}|$ of quantization error is suppressed to 2 e or less In this case, the optimal moving range x (for $x \geq -l_{M2}$) of the measurement reflection members (14 and 24) is expressed by formula (49) below from formulas (44) to (46) above:

$$\frac{-3 l_{M1} + l_{M2} + 2 l_R}{2} \leq x \leq \frac{l_{M1} - 3 l_{M2} + 2 l_R}{2} \qquad (49)$$

For example, the moving range x of the measurement reflection members (14 and 24), which range can suppress the maximum value ($|\Delta x_{MAX}|$) of the quantization errors to be added to the measurement outputs of the interferometer apparatuses to 2 e or less when the quantization error e (or resolution) of each of the first interferometer apparatus shown in FIG. 8A and the second interferometer apparatus shown in FIG. 8B is set to be 0.5 nm, and $l_{M1}$=0.7 m, $l_{M2}$=0.5 m, and $l_R$=$l_{R1}$=$l_{R2}$=0.6 m will be examined below.

In this case, as can be understood from formula (49), the moving range x of the measurement reflection members (14 and 24) corresponds to a range from −0.2 m to 0.2 m, and a precision of 1.0 nm (=2 e) is guaranteed in the interferometer apparatuses as a whole.

(IV) When maximum value $|\Delta x_{MAX}|$ of quantization error is suppressed to e or less In this case, the optimal moving range x (for $x \geq -l_{M2}$) of the measurement reflection members (14 and 24) is expressed by formula (50) below from formulas (44) to (46) above:

$$l_R - l_{M1} \leq x \leq l_R - l_{M2} \qquad (50)$$

For example, the moving range x of the measurement reflection members (14 and 24), which range can suppress the maximum value ($|\Delta x_{MAX}|$) of the quantization errors to be added to the measurement outputs of the interferometer apparatuses to e or less when the quantization error e (or resolution) of each of the first interferometer apparatus shown in FIG. 8A and the second interferometer apparatus shown in FIG. 8B is set to be 0.5 nm, and $l_{M1}$=0.7 m, $l_{M2}$=0.5 m, and $l_R$=$l_{R1}$=$l_{R2}$=0.6 will be examined below.

In this case, as can be understood from formula (50), the moving range x of the measurement reflection members (14 and 24) corresponds to a range from −0.3 m to 0.3 m, and a precision of 0.5 nm (=e) is guaranteed in the interferometer apparatuses as a whole.

As can be understood from the above description, according to the present invention, a stable measurement can be realized with high precision even when the refractive index of the gas changes due to an environmental change. In addition, the quantization errors e (or resolutions) of the two interferometers can be suppressed to ×1 or less in principle as long as the object to be measured (first and second measurement reflection units) is moved within a range satisfying formula (50), and a very stable, high-precision measurement can be attained. When a precision of ×1 or less of the quantization errors e (or resolutions) of the two interferometers is not required, the object to be measured (first and second measurement reflection units) need only be arranged to be movable within at least a range satisfying formula (50) above or a portion of the range.

The arrangement of an interferometer according to the first embodiment of the present invention will be described below with reference to FIG. 10. In this embodiment, a composite type interferometer in which first and second interferometers use a common measurement optical path is used, and the common measurement optical path reciprocates via a single measurement reflection units (movable mirror 3).

Figure 10:
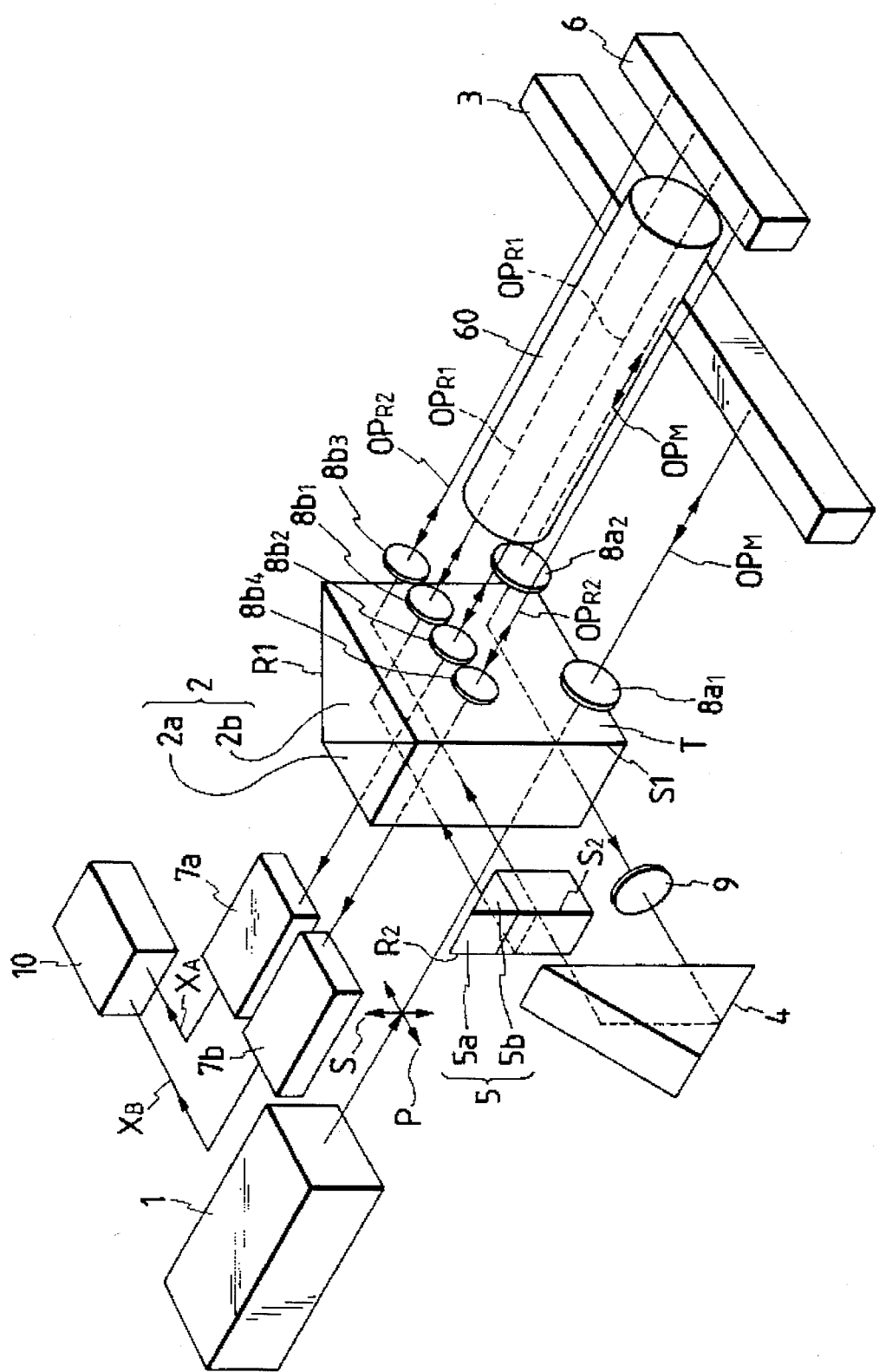
FIG. 10 is a perspective view showing the first embodiment adopting the first principle of the present invention.

The first embodiment shown in FIG. 10 comprises: a measurement reflection units (movable mirror 3) which is arranged to be movable in a measurement direction X; a first reference reflection units (sealed tube 60, stationary mirror 6) and a second reference reflection units (stationary mirror 6) which are respectively fixed at predetermined positions; a light source system 1 for supplying coherent light beams; a first interferometer system (prism member 2, quarterwave plates ($8a_1$, $8a_2$, $8b_1$, $8b_2$), halfwave plate 9, deflection prism 4, first detector 7a) for forming, based on the light beam from the light source system 1, a first measurement optical path $OP_M$ which reciprocates along the measurement direction X via the measurement reflection unit (movable mirror 3), and a first reference optical path $OP_{R1}$ which reciprocates via the first reference reflection units (sealed tube 60, stationary mirror 6), and generating a first measurement output $X_A$ based on light beams obtained via the first measurement optical path $OP_M$ and the first reference optical path $OP_{R1}$; a second interferometer system (prism member 2, quarterwave plates ($8a_1$, $8a_2$, $8b_3$, $8b_4$), halfwave plate 9, deflection prism 4, second detector 7b) for forming, based on the light beam from the light source system 1, a second measurement optical path common to the first measurement optical path $OP_M$ which reciprocates along the measurement direction X via the measurement reflection units (movable mirror 3), and a second reference optical path $OP_{R2}$ which reciprocates via the second reference reflection unit (stationary mirror 6), and generating a second measurement output $X_B$ based on light beams obtained via the second measurement optical path (the first measurement optical path $OP_M$) and the second reference optical path $OP_{R2}$; and a calculator 10 for performing a predetermined calculation based on the first and second measurement outputs ($X_A$, $X_B$). The first reference reflection unit (sealed tube 60, stationary mirror 6) and the second reference reflection unit (stationary mirror 6) are arranged, so that the optical paths ($OP_M$, $OP_{R1}$, $OP_{R2}$) extend to be parallel to and adjacent to each other.

Figure 11A:
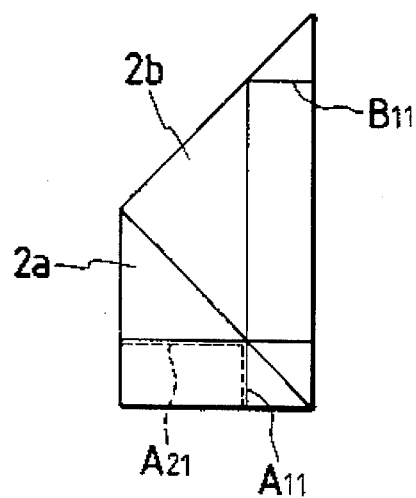
FIG. 11A is a plan view showing a state of a measurement optical path and first and second reference optical paths, which pass through a lower portion of a prism member 2 in the first embodiment shown in FIG. 10.

FIG. 10 shows main part of the laser interferometer apparatus of this embodiment. Referring to FIG. 10, an optical member 2 (to be referred to as a prism member 2 hereinafter) is prepared by adhering first and second rectangular prisms 2a and 2b. As shown in FIG. 11A, the prism member 2 is prepared by adhering the hypotenuse of the rectangular prism 2a, which has two orthogonal sides each having a length d1, and the hypotenuse inclined at 45°, to one of two orthogonal sides of the rectangular prism 2b, which has a hypotenuse having a length d2 (=2·d1) and inclined at 45°. The adhered surface (a surface on the side of one of the two orthogonal sides of the rectangular prism 2b) is formed by a polarization splitting surface (polarization beam splitter surface) $S_1$, and a surface on the side of the other one of the two orthogonal sides of the rectangular prism 2b is formed by a reflection surface $R_1$. Note that the reflection surface $R_1$ may be designed to totally reflect light without forming a reflection film thereon.

Note that the prism member 2 need only be constituted by orthogonally arranging the polarization splitting surface $S_1$ and the reflection surface $R_1$ in principle, and may be constituted by only the rectangular prism 2b. For example, as shown in FIG. 11D, a prism member 20 may be constituted by adhering three rectangular prisms 20a to 20c, the adhered surface between the rectangular prisms 20a and 20b may be formed by the polarization splitting surface $S_1$, and the external surface of the rectangular prism 20c may be formed by the reflection surface $R_1$. Thus, the prism member 20 may be used in place of the prism member 2.

Referring back to FIG. 10, if the direction of a light beam output from a laser source 1 as a light source system for supplying coherent light beams is defined to be an X direction, the prism member 2 is arranged, so that its polarization splitting surface $S_1$ is inclined through 45° with respect to the X direction. A movable mirror 3 as a measurement reflection units and a stationary mirror 6 as a reference reflection unit are arranged to oppose the prism member 2. The movable mirror 3 comprises a plane mirror which is fixed to an object to be measured (not shown), and is movable in the X direction. The stationary mirror 6 is fixed at a position separated by a predetermined distance b from the prism member 2 in the X direction. The movable mirror 3 and the stationary mirror 6 are arranged to be shifted from each other in a direction perpendicular to the X direction.

Six quarterwave plates ($8a_1$, $8a_2$, and $8b_1$ to $8b_4$) are parallelly arranged near a transmission surface T for defining the hypotenuse which forms equal angles with the two orthogonal sides ($S_1$ and $R_1$) of the rectangular prism 2b in the prism member 2. Between two ($8b_3$ and $8b_4$) out of these quarterwave plates and the stationary mirror 6, a sealed tube 60 (correction member) for sealing, by a predetermined length, two reciprocal optical paths which reciprocate via the two quarterwave plates ($8b_3$ and $8b_4$) upon being reflected by the stationary mirror 6 from a surrounding portion, is arranged and it will be described in detail later.

The sealed tube 60 is a member constituted by a hollow cylinder which has at least two transparent end faces, and a predetermined length L in the X direction, and its interior is evacuated. Thus, an optical path length D of portions, exposed to a gas (e.g., air), of the reciprocal optical paths, which reciprocate via the two quarterwave plates ($8b_3$ and $8b_4$) upon being reflected by the stationary mirror 6 is given by D=(b−L)n where b is the length, in the X direction, from the prism member 2 to the stationary mirror, and n is the refractive index of the gas to which the interferometer apparatus shown in FIG. 10 is exposed. Therefore, the arrangement of this sealed tube 60 is equivalent to an arrangement in which the stationary mirror 6 is arranged to be closer to the prism member 2 in the X direction by the length L of the sealed tube 60.

Note that a medium such as a gas, liquid, solid, or the like, which has a predetermined refractive index, may be sealed in this sealed tube.

In a direction in which a laser beam from the laser source 1 is reflected by the polarization splitting surface $S_1$ of the prism member 2, a deflection prism (rectangular prism) 4 as a deflection member for deflecting light emerging from the polarization splitting surface $S_1$ through 180° is arranged. In this case, the deflection prism 4 is aligned, so that a plane including an optical path deflected by the prism member 2 is parallel to the ridge between the polarization splitting surface $S_1$ and the reflection surface $R_1$ of the prism member 2, under the assumption that a laser beam returns again to the polarization splitting surface $S_1$ by two total reflections in the deflection prism 4.

A halfwave plate 9 is arranged midway along a lower optical path between the prism member 2 and the deflection prism 4, and an optical member (to be referred to as a prism member 5 hereinafter) having a shape similar to that of the prism member 2 is arranged midway along an upper optical path between the prism member 2 and the deflection prism 4. The prism member 5 is constituted by adhering two rectangular prisms (5a and 5b), its adhered surface (a surface on the side of one of two orthogonal sides of the rectangular prism 5b) is formed by a beam splitting surface (beam splitter surface) $S_2$, and a surface on the side of the other one of the two orthogonal sides of the rectangular prism 5b is formed by a reflection surface $R_2$.

In a direction in which a laser beam emerging from the deflection prism 4 is reflected by the polarization splitting surface $S_1$ after it is split and deflected (reflected by the beam splitting surface $S_2$ and reflected by the reflection surface $R_2$) by the prism member 5, a first receiver 7a as a first detector is arranged. Also, in a direction in which a laser beam emerging from the deflection prism 4 is reflected by the polarization splitting surface $S_1$ of the prism member 2 after it is transmitted through the beam splitting surface $S_2$ of the prism member 5, a second receiver 7b as a second detector is arranged.

As shown in FIG. 10, the first and second receivers (7a and 7b) are electrically connected to a calculator 10, and the calculator 10 performs a calculation of, e.g., formula (3) above on the basis of the outputs from the two receivers (7a and 7b). The calculation result is output to a display unit (not shown).

In place of the halfwave plate 9, a single quarterwave plate which can cover the entrance & exit surface of the deflection prism 4 or the surface, on the side of the deflection prism 4, of the prism member 2, may be arranged. In this case, the quarterwave plate may be directly joined to the entrance & exit surface of the deflection prism 4 or the surface, on the side of the deflection prism 4, of the prism member 2. Furthermore, a quarterwave plate may be arranged in an optical path between the prism member 2 and the deflection prism 4 or in an optical path between the deflection prism 4 and the prism member 5, and a quarterwave plate may be arranged in two optical paths formed between the prism members 5 and 2.

The operation of this embodiment will be described below. The laser source 1 as a light source system for supplying coherent light beams supplies a beam having a first frequency $f_1$ (to be referred to as a first beam hereinafter), and a beam having a second frequency $f_2$ (to be referred to as a second beam hereinafter). The first and second beams are incident on the polarization splitting surface $S_1$ of the prism member 2 at an incident angle of 45°.

Of the two beams supplied from the laser source 1, the first beam is linearly polarized light which oscillates in the plane of incidence of the polarization splitting surface $S_1$ (to be referred to as p-polarized light hereinafter), and the second beam is linearly polarized light which oscillates in a plane perpendicular to the plane of incidence of the polarization splitting surface $S_1$ (to be referred to as s-polarized light hereinafter).

First, the first beam (p-polarized light) supplied from the laser source 1 will be described below. The first beam (p-polarized light) is transmitted through the polarization splitting surface $S_1$ of the prism member 2, and is converted into circularly polarized light via the quarterwave plate $8a_1$. Thereafter, the first beam is reflected by the movable mirror 3, and is transmitted through the quarterwave plate $8a_1$ again to be converted into s-polarized light. The first beam (s-polarized light) is reflected by the polarization splitting surface $S_1$ of the prism member 2, and is deflected at 90° by the reflection surface $R_1$ of the prism member 2. Thereafter, the first beam (s-polarized light) is converted into circularly polarized light via the quarterwave plate $8a_2$, and is reflected by the movable mirror 3 toward the quarterwave plate $8a_2$ again. The first beam transmitted through the quarterwave plate $8a_2$ again is converted into p-polarized light, is reflected by the reflection surface $R_1$ again, and is transmitted through the polarization splitting surface $S_1$. The first beam (p-polarized light) transmitted through the polarization splitting surface $S_1$ is transmitted through the halfwave plate 9, and is converted from p-polarized light into s-polarized light since its plane of polarization is rotated through 90°. The first beam converted into s-polarized light by the halfwave plate 9 is deflected at 180° by the deflection prism 4, and is split into two beams by the beam splitting surface $S_2$ of the prism member 5.

One first beam (s-polarized light) reflected by the beam splitting surface $S_2$ of the prism member 5 is deflected at 90° by the reflection surface $R_2$ of the prism member 5, is reflected by the polarization splitting surface $S_1$ of the prism member 2, and is then received by the first receiver 7a.

On the other hand, the other first beam (s-polarized light) transmitted through the beam splitting surface $S_2$ of the prism member 5 is reflected by the polarization splitting surface $S_1$ of the prism member 2, and is received by the second receiver 7b.

The second beam (s-polarized light) supplied from the laser source 1 will be described below. The second beam (s-polarized light) is reflected by the polarization splitting surface $S_1$ of the prism member 2, and propagates toward the halfwave plate 9. The second beam transmitted through the halfwave plate 9 is converted from s-polarized light into p-polarized light since its plane of polarization is rotated through 90°. Thereafter, the second beam is deflected at 180° by the deflection prism 4, and is split into two beams by the beam splitting surface $S_2$ of the prism member 5.

One second beam (p-polarized light) reflected by the beam splitting surface $S_2$ of the prism member 5 is deflected at 90° by the reflection surface $R_2$ of the prism member 5, and is transmitted through the polarization splitting surface $S_1$ of the prism member 2. The second beam transmitted through the polarization splitting surface $S_1$ is deflected at 90° by the reflection surface $R_1$, and is then converted into circularly polarized light via the quarterwave plate $8b_1$. Thereafter, the second beam converted into circularly polarized light passes through the sealed tube 60 having the predetermined length L in the X direction (measurement direction), and is reflected by the stationary mirror 6. Then, the second beam passes through the sealed tube 60 again, and is converted into s-polarized light via the quarterwave plate $8b_1$. The second beam converted into s-polarized light is reflected by the reflection surface $R_1$ of the prism member 2, and is reflected by the polarization splitting surface $S_1$ of the prism member 2 toward the quarterwave plate $8b_2$. The second beam transmitted through the quarterwave plate $8b_2$ is converted into circularly polarized light, and then passes through the sealed tube 60. The second beam is reflected by the stationary mirror 6, and propagates toward the sealed tube 60 again. The second beam passing through the sealed tube 60 is transmitted through the quarterwave plate $8b_2$ to be converted into p-polarized light, is transmitted through the polarization splitting surface $S_1$ of the prism member 2, and is received by the first receiver 7a.

On the other hand, the other second beam (p-polarized light) transmitted through the beam splitting surface $S_2$ of the prism member 5 is transmitted through the polarization splitting surface $S_1$ of the prism member 2, is deflected at 90° by the reflection surface $R_1$, and propagates toward the quarterwave plate $8b_3$. The second beam transmitted through the quarterwave plate $8b_3$ is converted into circularly polarized light, is reflected by the stationary mirror 6, and is transmitted through the quarterwave plate $8b_3$ again to be converted into s-polarized light. The second beam converted into s-polarized light is reflected by the reflection surface $R_1$ of the prism member 2, and is reflected by the polarization splitting surface $S_1$ toward the quarterwave plate $8b_4$. The second beam transmitted through the quarterwave plate $8b_4$ is converted into circularly polarized light, is reflected by the stationary mirror 6, and is transmitted through the quarterwave plate $8b_4$ again to be converted into p-polarized light. The second beam which is converted into p-polarized light via the quarterwave plate $8b_4$ is transmitted through the polarization splitting surface $S_1$, and is received by the second receiver 7b.

In the first receiver 7a, the first beam which propagates along a measurement optical path $OP_M$ having a length x (a distance, in the X direction, from the surface T of the prism member 2 to the movable mirror 3) via a gas such as air between the prism member 2 and the movable mirror 3, and the second beam which propagates, in the vicinity of the measurement optical path $OP_M$, along a first reference optical path $OP_{R1}$ having a length b (a distance, in the X direction, from the surface T of the prism member 2 to the stationary mirror 6) via the gas such as air between the prism member 2 and the stationary mirror 6, and the sealed tube 60, are incident on an internal light-receiving element after their directions of polarization are aligned by an internal analyzer.

Since the sealed tube 60 is arranged in the first reference optical path $OP_{R1}$, if the length, in the X direction, of the sealed tube 60 is represented by L, this arrangement is equivalent to an arrangement in which the stationary mirror 6 is arranged to be shifted toward the prism member 2 side by the length L of the sealed tube 60, with respect to a change in refractive index of the gas such as air, as described above. Therefore, the light-receiving element of the first receiver 7a receives the first beam, which propagates along the measurement optical path $OP_M$ having the length x (the distance, in the X direction, from the surface T of the prism ember 2 to the movable mirror 3) via the gas such as air between the prism member 2 and the movable mirror 3, and the second beam which propagates, in the vicinity of the measurement optical path $OP_M$, along the first reference optical path $OP_{R1}$ having a length a (=b–L) via the gas such as air between the prism member 2 and the stationary mirror 6.

For this reason, the light-receiving element of the first receiver 7a outputs a beat signal having a frequency of $(f_1-f_2)$ in a state wherein the movable mirror 3 stands still relative to the stationary mirror 6, and outputs a frequency-modulated beat signal when the movable mirror 3 moves in the X direction. Therefore, by accumulating the change in frequency, the relative moving amount, in the X direction, between the movable mirror 3 and the stationary mirror 6 can be detected. Thus, the first receiver 7a outputs a signal $X_A$ corresponding to $nx+(x-a)\Delta n$ to the calculator 10 where x is the length of the measurement optical path $OP_M$ passing through the gas such as air (or the optical path length of the measurement optical path $OP_M$ from the prism member 2 to the movable mirror 6 of the interferometer), a is the length of the first reference optical path $OP_{R1}$ passing through the gas such as air (or the optical path length of the first reference optical path $OP_{R1}$ from the prism member 2 to the stationary mirror 6 of the interferometer), n is the refractive index of the gas such as air in an initial state such as a state at the beginning of measurement (upon resetting), and $\Delta n$ is the change in refractive index of the gas such as air.

On the other hand, in the second receiver 7b, the first beam which propagates along a measurement optical path $OP_M$ having the length x (the distance, in the X direction, from the surface T of the prism member 2 to the movable mirror 3) via the gas such as air between the prism member 2 and the movable mirror 3, and the second beam which propagates, in the vicinity of the measurement optical path $OP_M$, along a second reference optical path $OP_{R2}$ having the length b (the distance, in the X direction, from the surface T of the prism member 2 to the stationary mirror 6) via the gas such as air between the prism member 2 and the stationary mirror 6, and the sealed tube 60, are incident on an internal light-receiving element after their directions of polarization are aligned by an internal analyzer.

The light-receiving element of the second receiver 7b outputs a beat signal having a frequency of $(f_1-f_2)$ in a state wherein the movable mirror 3 stands still relative to the stationary mirror 6, and outputs a frequency-modulated beat signal when the movable mirror 3 moves in the X direction as in the first receiver 7a. Therefore, by accumulating the change in frequency, the relative moving amount, in the X direction, between the movable mirror 3 and the stationary mirror 6 can be detected. Thus, the second receiver 7b outputs a signal $X_B$ corresponding to $nx+(x-b)\Delta n$ to the calculator 10 where x is the length of the measurement optical path $OP_M$ passing through the gas such as air (or the optical path length of the measurement optical path $OP_M$ from the prism member 2 to the movable mirror 6 of the interferometer), b is the length of the second reference optical path $OP_{R2}$ passing through the gas such as air (or the optical path length of the second reference optical path $OP_{R2}$ from the prism member 2 to the stationary mirror 6 of the interferometer), n is the refractive index of the gas such as air in an initial state such as a state at the beginning of measurement (upon resetting), and An is the change in refractive index of the gas such as air.

In the calculator 10, a predetermined formula is memorized, for example, a formula such as formula (3) above is memorized. Therefore, the calculator 10 executes a calculation given by, e.g., formula (3) above on the basis of the output signals ($X_A$ and $X_B$) from the first and second receivers (7a and 7b) and an output n from a refractive index detector (not shown) for detecting an initial refractive index n of the gas at the beginning of measurement. Then, the calculation result for which a measurement error caused by the change in refractive index of the gas due to, e.g., a fluctuation of the gas is corrected is output via a display unit (not shown).

When a first movable mirror and a second movable mirror (3) are integrally moved to satisfy formulas (21) to (24) or formulas (35) to (41), the quantization error e to be added to the output from the interferometer apparatus can be suppressed to ×4 to ×1 or less.

As described above, according to this embodiment, since the measurement optical path and the reference optical paths are arranged adjacent to each other by the interferometer, a measurement error caused by the change in refractive index of the gas in the measurement optical path can be corrected, and the moving amount and position of the movable mirror 3 can be detected with high precision.

In addition, according to this embodiment, since the movable mirror can be moved along a space defined between itself and two stationary mirrors so as to internally divide the distance to the two stationary mirrors, measurement with very high precision can be assured.

In this embodiment, the interferometer apparatus is designed, so that the measurement optical path length and the reference optical path lengths passing through the interior of the prism member 2 are equal to each other, and a high-precision measurement is attained even when the prism member 2 undergoes a change in temperature.

Prior to the detailed description of this feature, the optical paths, in the prism member 2, of the measurement first beam and the reference second beam incident on the first receiver 7a will be described below with reference to FIGS. 11A and 11b.

The measurement first beam passing through the lower portion in the prism member 2 passes through an optical path $A_{11}$ in the rectangular prism 2a, and an optical path $B_{11}$ in the rectangular prism 2b, as indicated by solid lines in FIG. 11A. The measurement first beam passing through the upper portion in the prism member 2 passes through an optical path $A_{12}$ in only the rectangular prism 2a, as indicated by a solid line in FIG. 11B.

On the other hand, the reference second beam passing through the lower portion in the prism member 2 passes through an optical path $A_{21}$ in only the rectangular prism 2a, as indicated by a dotted line in FIG. 11A. The reference second beam passing through the upper portion in the prism member 2 passes through an optical path $A_{22}$ in the rectangular prism 2a, and an optical path $B_{22}$ in the rectangular prism 2b, as indicated by dotted lines in FIG. 11A.

Figure 11B:
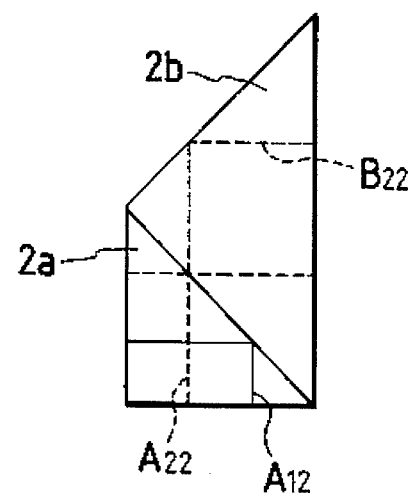
FIG. 11B is a plan view showing a state of a measurement optical path and a first reference optical path, which pass through an upper portion of the prism member 2 in the first embodiment shown in FIG. 10.

Therefore, the optical path lengths of the measurement first beam and the reference second beam passing through the prism member 2 are respectively given by $A_{11}+B_{11}+A_{12}$ and $A_{21}+A_{22}+B_{22}$, and as is apparent from FIGS. 11A and 11B, since the relations of $A_{11}=A_{12}=A_{21}=A_{22}=d_1$ and $B_{11}=B_{22}=d_2$ are established, the optical path lengths of the measurement first beam and the reference second beam passing through the prism member 2 are equal to each other.

The optical paths, in the prism member 2, of the measurement first beam and the reference second beam to be incident on the second receiver 7b will be described below with reference to FIGS. 11A and 11C.

The measurement first beam passing through the lower portion in the prism member 2 passes through the optical path $A_{11}$ in the rectangular prism 2a, and the optical path $B_{11}$ in the rectangular prism 2b, as indicated by solid lines in FIG. 11A. The measurement first beam passing through the upper portion in the prism member 2 passes through the optical path $A_{12}$ in only the rectangular prism 2a, as indicated by a solid line in FIG. 11C.

On the other hand, the reference second beam passing through the lower portion in the prism member 2 passes through the optical path $A_{21}$ in only the rectangular prism 2a, as indicated by a dotted line in FIG. 11A. The reference second beam passing through the upper portion in the prism member 2 passes through an optical path $A_{32}$ in the rectangular prism 2a, and an optical path $B_{32}$ in the rectangular prism 2b, as indicated by dotted lines in FIG. 11C.

Figure 11C:
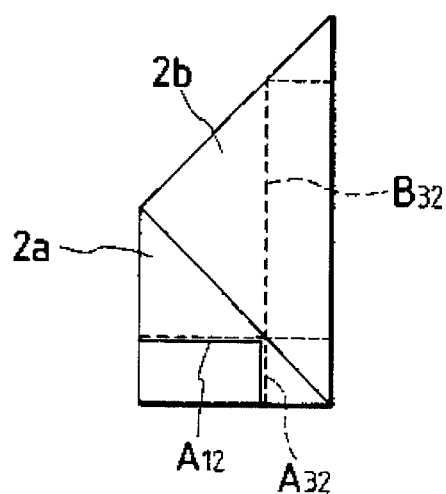
FIG. 11C is a plan view showing a state of a measurement optical path and a second reference optical path, which pass through the upper portion of the prism member 2 in the first embodiment shown in FIG. 10.
Figure 11D:
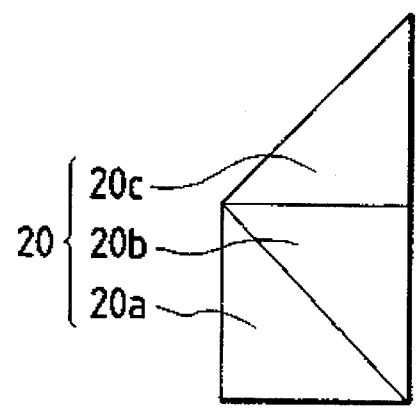
FIG. 11D is a plan view showing another example of the prism member 2 in the first embodiment shown in FIG. 10.

Therefore, the optical path lengths of the measurement first beam and the reference second beam passing through the prism member 2 are respectively given by $A_{11}+B_{11}+A_{12}$ and $A_{21}+A_{32}+B_{32}$, and as is apparent from FIGS. 11A and 11C, since the relations of $A_{11}=A_{12}=A_{21}=A_{32}=d_1$ and $B_{11}=B_{32}=d_2$ are established, the optical path lengths of the measurement first beam and the reference second beam passing through the prism member 2 are equal to each other.

Therefore, even if a temperature difference occurs between the rectangular prisms 2a and 2b, since the difference between the optical path lengths of the first and second beams is left unchanged, the moving amount, in the X direction, of the movable mirror 3 can be measured with high precision all the time.

In the first embodiment shown in FIG. 10, the six quarterwave plates ($8a_1$, $8a_2$, and $8b_1$ to $8b_4$) are used. Alternatively, a single quarterwave plate obtained by integrating these quarterwave plate may be used, and may be joined integrally to the surface T of the prism member 2.

In the first embodiment shown in FIG. 10, the laser source 1 and the two receivers (7a and 7b) are arranged on the first surface side of the rectangular prism 2a having two orthogonal surfaces, and the halfwave plate 9, the prism member 5, and the rectangular prism 4 are arranged on the second surface side thereof. However, the present invention is not limited to this arrangement. For example, the laser source 1 and the two receivers (7a and 7b) may be arranged on the second surface side of the rectangular prism 2a, and the halfwave plate 9, the prism member 5, and the rectangular prism 4 may be arranged on the first surface side of the rectangular prism 2a.

An interferometer apparatus according to the second embodiment of the present invention will be described below with reference to FIG. 12. The second embodiment shown in FIG. 12 corresponds to a modification of the first embodiment shown in FIG. 10, and the same reference numerals in FIG. 12 denote members having the same functions as in FIG. 10.

Figure 12:
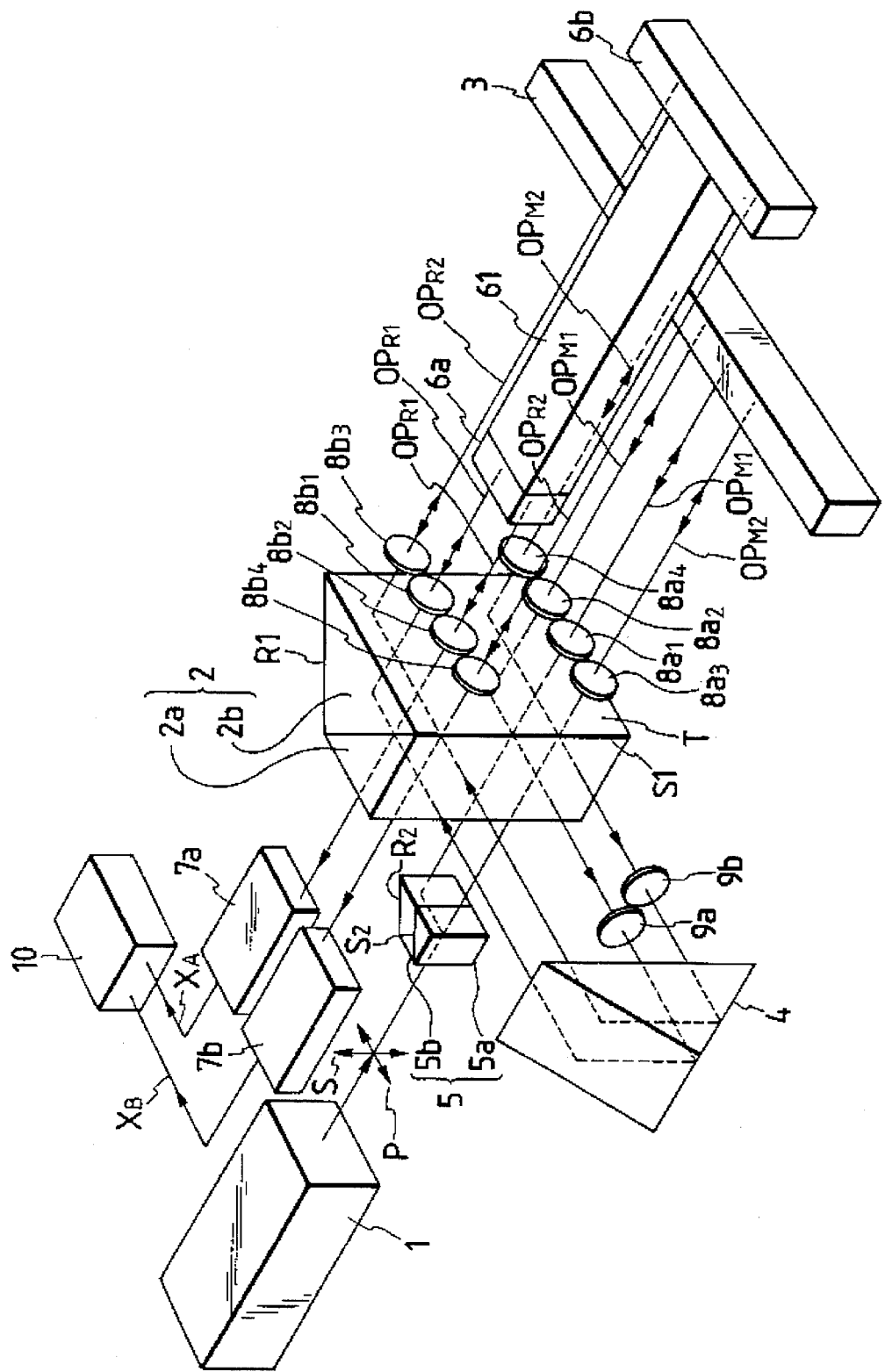
FIG. 12 is a perspective view showing the second embodiment adopting the first principle of the present invention.

As shown in FIG. 12, a large difference between this embodiment and the first embodiment is that the prism member 5 arranged between the deflection prism 4 and the prism member 2 in the first embodiment in FIG. 10 is arranged between the laser source 1 and the prism member 2, and two reference stationary mirrors (6a and 6b) are arranged at different positions in the X direction via a rod-like member 61. Another difference between this embodiment and the first embodiment is that in the first embodiment, the two quarterwave plates ($8a_1$ and $8a_2$) are arranged between the prism member 2 and the movable mirror 3, and the single halfwave plate 9 is arranged between the prism member 2 and the deflection prism 4, while in the second embodiment shown in FIG. 12, four quarterwave plates ($8a_1$ to $8a_4$) are arranged between the prism member 2 and the movable mirror 3, and two halfwave plates (9a and 9b) are arranged between the prism member 2 and the deflection prism 4.

The arrangement of the second embodiment shown in FIG. 12 will be briefly described below. This embodiment comprises: a movable mirror 3 which is arranged to be movable in a measurement direction X; first and second stationary mirrors 6a and 6b fixed at predetermined positions; a light source system (laser source 1, prism member 5) for supplying coherent light beams; a first interferometer system (prism member 2, quarterwave plates ($8a_1$, $8a_2$, $8b_1$, $8b_2$), halfwave plate 9a, deflection prism 4, first detector 7a) for forming, based on a light beam from the light source system (1, 5), a first measurement optical path $OP_{M1}$ which reciprocates in the measurement direction X via the movable mirror 3, and a first reference optical path $OP_{R1}$ which reciprocates via the first stationary mirror 6a, and generating a first measurement output $X_A$ based on light beams obtained via the first measurement optical path $OP_{M1}$ and the first reference optical path $OP_{R1}$; a second interferometer system (prism member 2, quarterwave plates ($8a_3$, $8a_4$, $8b_3$, $8b_4$), halfwave plate 9b, deflection prism 4, second detector 7b) for forming, based on a light beam from the light source system (1, 5), a second measurement optical path $OP_{M2}$ which reciprocates in the measurement direction X via the movable mirror 3, and a second reference optical path $OP_{R2}$ which reciprocates via the second stationary mirror 6b, and generating a second measurement output $X_B$ based on light beams obtained via the second measurement optical path $OP_{M2}$ and the second reference optical path $OP_{R2}$; and a calculator 10 for performing a predetermined calculation on the basis of the first and second measurement outputs ($X_A$, $X_B$). The first and second stationary mirrors 6a and 6b are arranged to be separated by a predetermined distance in the measurement direction, and the optical paths ($OP_{M1}$, $OP_{M2}$, $OP_{R1}$, and $OP_{R2}$) are set to be parallel to each other.

Optical path circuits of this embodiment will be described below with reference to FIG. 12. The laser source 1 supplies a beam having a first frequency $f_1$ (to be referred to as a first beam hereinafter), and a beam having a second frequency $f_2$ (to be referred to as a second beam hereinafter). The first and second beams are incident on the beam splitting surface $S_2$ of the prism member 5 at an incident angle of 45°.

Of the two beams supplied from the laser source 1, the first beam as one beam is linearly polarized light which oscillates in the plane of incidence of the beam splitting surface $S_1$ (to be referred to as p-polarized light hereinafter), and the second beam as the other beam is linearly polarized light which oscillates in a plane perpendicular to the plane of incidence of the beam splitting surface $S_1$ (to be referred to as s-polarized light hereinafter).

Each of the first and second beams is split into two beams by the beam splitting surface (semi-transparent surface) $S_2$ of the prism member 5, which serves as a beam splitting member for splitting a beam from a light source into two beams. The first and second beams reflected by the beam splitting surface $S_2$ are incident on the prism member 2 via the reflection surface $R_2$ of the prism member 5, and the first and second beams transmitted through the beam splitting surface $S_2$ are directly incident on the prism member 2.

First, the first and second beams, which propagate towards the prism member 2 via the beam splitting surface $S_2$ and the reflection surface $R_2$ of the prism member 5, will be described below.

The first and second beams which propagate via the beam splitting surface $S_2$ and the reflection surface $R_2$ of the prism member 5 are incident on the polarization splitting surface $S_1$ of the prism member 2 at an incident angle of 45°. In this case, since the first beam is p-polarized light which is linearly polarized in the plane of incidence with respect to the polarization splitting surface $S_1$, and the second beam is s-polarized light which is linearly polarized in a plane perpendicular to the plane of incidence with respect to the polarization splitting surface $S_1$, the first beam (p-polarized light) is transmitted through the polarization splitting surface $S_1$, and the second beam (s-polarized light) is reflected by the polarization splitting surface $S_1$.

The first beam (p-polarized light) transmitted through the polarization splitting surface $S_1$ is converted into circularly polarized light via the quarterwave plate $8a_1$, is reflected by the movable mirror 3, and is transmitted through the quarterwave plate $8a_1$ again to be converted into s-polarized light. The first beam (s-polarized light) is reflected by the polarization splitting surface $S_1$ of the prism member 2, and is deflected at 90° by the reflection surface $R_1$ of the prism member 2. Thereafter, the first beam (s-polarized light) is converted into circularly polarized light via the quarterwave plate $8a_2$, is reflected by the movable mirror 3, and propagates toward the quarterwave plate $8a_2$ again. The first beam transmitted through the quarterwave plate $8a_2$ again is converted into p-polarized light, is reflected by the reflection surface $R_1$ again, and is transmitted through the polarization splitting surface $S_1$. The first beam (p-polarized light) transmitted through the polarization splitting surface $S_1$ is converted from p-polarized light into s-polarized light via the halfwave plate 9a since its plane of polarization is rotated through 90°. The first beam converted into s-polarized light by the halfwave plate 9a is deflected at 180° by the deflection prism 4, is reflected by the polarization splitting surface $S_1$, and is received by the first receiver 7a.

On the other hand, the second beam (s-polarized light), which is reflected by the polarization splitting surface $S_1$ of the prism member 2 via the beam splitting surface $S_2$ and the reflection surface $R_2$ of the prism member 5, is transmitted through the halfwave plate 9a to be converted from s-polarized light into p-polarized light since its plane of polarization is rotated through 90°. Thereafter, the second beam is deflected at 180° by the deflection prism 4, and is transmitted through the polarization splitting surface $S_1$ of the prism member 2. The second beam (p-polarized light) transmitted through the polarization splitting surface $S_1$ is deflected at 90° by the reflection surface $R_1$, and is then transmitted through the quarterwave plate $8b_1$ to be converted into circularly polarized light. Thereafter, the second beam converted into circularly polarized light is reflected by the first stationary mirror 6a which is separated from the surface T of the prism member by a predetermined distance a in the X direction, and is transmitted through the quarterwave plate $8b_1$ again to be converted into s-polarized light. The second beam converted into s-polarized light is reflected by the reflection surface $R_1$ of the prism member 2, and is also reflected by the polarization splitting surface $S_1$ of the prism member 2 toward the quarterwave plate $8b_2$. The second beam transmitted through the quarterwave plate $8b_2$ is converted into circularly polarized light, is then reflected by the first stationary mirror 6a, and is transmitted through the quarterwave plate $8b_2$ to be converted into p-polarized light. The second beam converted into p-polarized light is transmitted through the polarization splitting surface $S_1$ of the prism member 2, and is received by the first receiver 7a.

The first and second beams supplied from the laser source 1, and transmitted through the beam splitting surface $S_2$ of the prism member 5 will be described below.

The first and second beams which propagate via the beam splitting surface $S_2$ of the prism member 5 are incident on the polarization splitting surface $S_1$ of the prism member 2 at an incident angle of 45°. Since the first beam is p-polarized light which is linearly polarized in the plane of incidence with respect to the polarization splitting surface $S_1$, and the second beam is s-polarized light which is linearly polarized in a plane perpendicular to the plane of incidence with respect to the polarization splitting surface $S_1$, the first beam (p-polarized light) is transmitted through the polarization splitting surface $S_1$, and the second beam (s-polarized light) is reflected by the polarization splitting surface $S_1$.

The first beam (p-polarized light) transmitted through the polarization splitting surface $S_1$ is converted into circularly polarized light via the quarterwave plate $8a_3$, is then reflected by the movable mirror 3, and is transmitted through the quarter wave plate $8a_3$ again to be converted into s-polarized light. The first beam (s-polarized light) is reflected by the polarization splitting surface $S_1$ of the prism member 2, and is deflected at 90° by the reflection surface $R_1$ of the prism member 2. Thereafter, the first beam (s-polarized light) is converted into circularly polarized light via the quarterwave plate $8a_4$, is reflected by the movable mirror 3, and propagates toward the quarterwave plate $8a_4$ again. The first beam transmitted through the quarterwave plate $8a_4$ again is converted into p-polarized light, is reflected by the reflection surface $R_1$ again, and is transmitted through the polarization splitting surface $S_1$. The first beam (p-polarized light) transmitted through the polarization splitting surface $S_1$ is transmitted through the quarterwave plate 9b to be converted from p-polarized light into s-polarized light since its plane of polarization is rotated through 90°. The first beam converted into s-polarized light by the quarterwave plate 9b is deflected at 180° by the deflection prism 4, is reflected by the polarization splitting surface $S_1$, and is received by the second receiver 7b.

On the other hand, the second beam (s-polarized light), which is transmitted through the beam splitting surface $S_2$ of the prism member 5, and is reflected by the polarization splitting surface $S_1$ of the prism member 2, is transmitted through the halfwave plate 9b to be converted from s-polarized light into p-polarized light since its plane of polarization is rotated through 90°. Thereafter, the second beam is deflected at 180° by the deflection prism 4, and is transmitted through the polarization splitting surface $S_1$ of the prism 2. The second beam (p-polarized light) transmitted through the polarization splitting surface $S_1$ is deflected at 90° by the reflection surface $R_1$, and is then transmitted through the quarterwave plate $8b_3$ to be converted into circularly polarized light. Thereafter, the second beam converted into circularly polarized light is reflected by second stationary mirror 6b which is separated from the surface T of the prism member by a predetermined distance b in the X direction, and is transmitted through the quarterwave plate $8b_3$ again to be converted into s-polarized light. The second beam converted into s-polarized light is reflected by the reflection surface $R_1$ of the prism member 2, and is also reflected by the polarization splitting surface $S_1$ of the prism member 2 toward the quarterwave plate $8b_4$. The second beam transmitted through the quarterwave plate $8b_4$ is converted into circularly polarized light, is reflected by the second stationary mirror 6b, and is transmitted through the quarterwave plate $8b_4$ to be converted into p-polarized light. The second beam converted into p-polarized light is transmitted through the polarization splitting surface $S_1$ of the prism member 2, and is received by the second receiver 7a.

As described above, in the interferometer apparatus according to the second embodiment of the present invention, in the first receiver 7a, the first beam which propagates along a first measurement optical path $OP_{M1}$ having a length x (a distance, in the X direction, from the surface T of the prism member 2 to the movable mirror 3) via a gas such as air between the prism member 2 and the movable mirror 3, and the second beam which propagates, in the vicinity of the first measurement optical path $OP_{M1}$, along a first reference optical path $OP_{R1}$ having a length a (a distance, in the X direction from the surface T of the prism member 2 to the first stationary mirror 6a) via the gas such as air between the prism member 2 and the first stationary mirror 6a, are incident on an internal light-receiving element after their directions of polarization are aligned by an internal analyzer.

For this reason, the light-receiving element of the first receiver 7a outputs a beat signal having a frequency of $(f_1-f_2)$ in a state wherein the movable mirror 3 stands still relative to the first stationary mirror 6a, and outputs a frequency-modulated beat signal when the movable mirror 3 moves in the X direction. Therefore, by accumulating the change in frequency, the relative moving amount, in the X direction, between the movable mirror 3 and the stationary mirror 6 can be detected. Thus, the first receiver 7a outputs a signal $X_A$ corresponding to $nx+(x-a)\Delta n$ to the calculator 10 where x is the length of the first measurement optical path $OP_{M1}$ passing through the gas such as air (or the optical path length of the first measurement optical path $OP_{M1}$ from the prism member 2 to the movable mirror 3 of the first interferometer), a is the length of the first reference optical path $OP_{R1}$ passing through the gas such as air (or the optical path length of the first reference optical path $OP_{R1}$ from the prism member 2 to the stationary mirror 6 of the interferometer system), n is the refractive index of the gas such as air in an initial state such as a state at the beginning of measurement (upon resetting), and $\Delta n$ is the change in refractive index of the gas such as air.

On the other hand, in the second receiver 7b, the first beam which propagates along a second measurement optical path $OP_{M2}$ having a length x (a distance, in the X direction, from the surface T of the prism member 2 to the movable mirror 3) via the gas such as air between the prism member 2 and the movable mirror 3, and the second beam which propagates, in the vicinity of the second measurement optical path $OP_{M2}$, along a second reference optical path $OP_{R2}$ having a length b (a distance, in the X direction, from the surface T of the prism member 2 to the second stationary mirror 6b) via the gas such as air between the prism member 2 and the second stationary mirror 6b, are incident on an internal light-receiving element after their directions of polarization are aligned by an internal analyzer.

The light-receiving element of the second receiver 7b outputs a beat signal having a frequency of $(f_1-f_2)$ in a state wherein the movable mirror 3 stands still relative to the stationary mirror 6, and outputs a frequency-modulated beat signal when the movable mirror 3 moves in the X direction as in the first receiver 7a. Therefore, by accumulating the change in frequency, the relative moving amount, in the X direction, between the movable mirror 3 and the stationary mirror 6 can be detected. Thus, the second receiver 7b outputs a signal $X_B$ corresponding to $nx+(x-b)\Delta n$ to the calculator 10 where x is the length of the second measurement optical path $OP_{M2}$ passing through the gas such as air (or the optical path length of the second measurement optical path $OP_{M2}$ from the prism member 2 to the movable mirror 3 of the second interferometer system), b is the length of the second reference optical path $OP_{R2}$ passing through the gas such as air (or the optical path length of the second reference optical path $OP_{R2}$ from the prism member 2 to the stationary mirror 6 of the interferometer system), n is the refractive index of the gas such as air in an initial state such as a state at the beginning of measurement (upon resetting), and $\Delta n$ is the change in refractive index of the gas such as air.

In the calculator 10, a predetermined formula is memorized, for example, a formula such as formula (3) above is memorized as in the first embodiment. The calculator 10 executes a calculation given by, formula (3) above on the basis of the output signals ($X_A$ and $X_B$) from the first and second receivers (7a and 7b) and an output n from a refractive index detector (not shown) for detecting an initial refractive index n of the gas at the beginning of measurement. Then, the calculation result for which a measurement error caused by the change in refractive index of the gas due to, e.g., a fluctuation of the gas is corrected is output via a display unit (not shown).

When a first movable mirror and a second movable mirror (3) are integrally moved to satisfy formulas (21) to (24) or formulas (35) to (41), the quantization error e to be added to the output from the interferometer apparatus can be suppressed to ×4 to ×1 or less.

In the second embodiment as well, since the movable mirror can be moved along a space defined between itself and two stationary mirrors so as to internally divide the distance to the two stationary mirrors, measurement with very high precision can be assured as in the first embodiment.

Although a detailed description is omitted, in the second embodiment as well, since the interferometer apparatus is designed so that the measurement optical path lengths and the reference optical path lengths passing through the interior of the prism member 2 are equal to each other, a high-precision measurement can be realized even when a temperature difference occurs in the prism member 2.

In the second embodiment shown in FIG. 12, the eight quarterwave plates ($8a_1$ to $8a_4$, and $8b_1$ to $8b_4$) are used. However, these quarterwave plates may be realized by a single quarterwave plate, and the single quarterwave plate may be joined integrally to the surface T of the prism member.

Also, in place of the two halfwave plates (9a and 9b) of the second embodiment shown in FIG. 12, a single quarterwave plate which can cover four optical paths formed between the deflection prism 4 and the prism member 2 may be arranged, a quarterwave plate which covers the entrance/exit surface of the deflection prism 4 may be arranged integrally with the deflection prism 4, or a quarterwave plate, which covers the entire surface, on the side of the deflection prism 4, of the prism member 2, may be arranged integrally with the prism member 2.

In the second embodiment shown in FIG. 12, the laser source 1, the prism member 5, and the two receivers (7a and 7b) are arranged on the first surface side of the rectangular prism 2a having two orthogonal surfaces, and the two halfwave plates (9a and 9b) and the rectangular prism 4 are arranged on the second surface side thereof. However, the present invention is not limited to this arrangement. For example, the laser source 1, the prism member 5, and the two receivers (7a and 7b) may be arranged on the second surface side of the rectangular prism 2a, and the two halfwave plates (9a and 9b) and the rectangular prism 4 may be arranged on the first surface side of the rectangular prism 2a.

In the second embodiment shown in FIG. 12, the light source means for supplying a coherent light beam is constituted by the laser source 1, and the prism member 5 serving as the beam splitting means. Alternatively, two laser light sources may be used as the light source means, so that a light beam from one laser source is guided to the first interferometer system (prism member 2, quarterwave plates ($8a_1$, $8a_2$, $8b_1$, $8b_2$), halfwave plate 9a, deflection prism 4, first detector 7a), and a light beam from the other laser source is guided to the second interferometer system (prism member 2, quarterwave plates ($8a_3$, $8a_4$, $8b_3$, $8b_4$), halfwave plate 9b, deflection prism 4, second detector 7b). In this case, when the two light sources (laser sources) undergo a change in optical characteristic (e.g., wavelength variation, and the like), it is desirable to arrange correction means for correcting the change in optical characteristic.

In each of the above embodiments, the present invention is applied to a heterodyne type laser interferometer. However, the present invention can be similarly applied to a homodyne type interferometer. Also, a corner cube or the like may be used in place of a rectangular prism 4.

In each of the above embodiments, the measurement and reference optical paths formed by the first and second interferometers are arranged to be adjacent to and parallel to each other. However, the present invention is not limited to this.

Thus, the third embodiment as another modification of the first embodiment shown in FIG. 10 will be described below with reference to FIG. 13. Note that the same reference numerals in FIG. 13 denote members having the same functions as in FIG. 10.

In this embodiment, the prism member 2 of the first embodiment shown in FIG. 10 is divided into two members, i.e., a lower prism member 62 for forming a measurement optical path $OP_M$, and an upper prism member 63 for forming two reference optical paths ($OP_{R1}$ and $OP_{R2}$). The upper prism member 63 is arranged to be rotated through 90° with respect to the lower prism member 62, so that the two reference optical paths ($OP_{R1}$ and $OP_{R2}$) are not parallel to, i.e., are perpendicular to the measurement optical path $OP_M$.

The lower prism member 62 is constituted by adhering a rectangular prism 62a and a rectangular prism 62b, and this adhered surface is formed by a polarization splitting surface (polarization beam splitter surface) $S_3$. On the other hand, the upper prism member 63 is constituted by adhering rectangular prisms 63a and 63b, and this adhered surface is formed by a polarization splitting surface (polarization beam splitter surface) $S_4$.

Note that the arrangements other than the prism members 62 and 63 are the same as those in the first embodiment shown in FIG. 10, and a detailed description including the operation of the apparatus will be omitted.

As described above, according to the embodiment shown in FIG. 13, a measurement error caused by a change in refractive index of a gas in the measurement optical path can be corrected, and the moving amount and position of the movable mirror 3 can be detected with high precision. In addition, in this embodiment as well, since a movable mirror can be moved along a space defined between itself and two stationary mirrors so as to internally divide the distance to the two stationary mirrors, measurement with very high precision can be assured.

Figure 13:
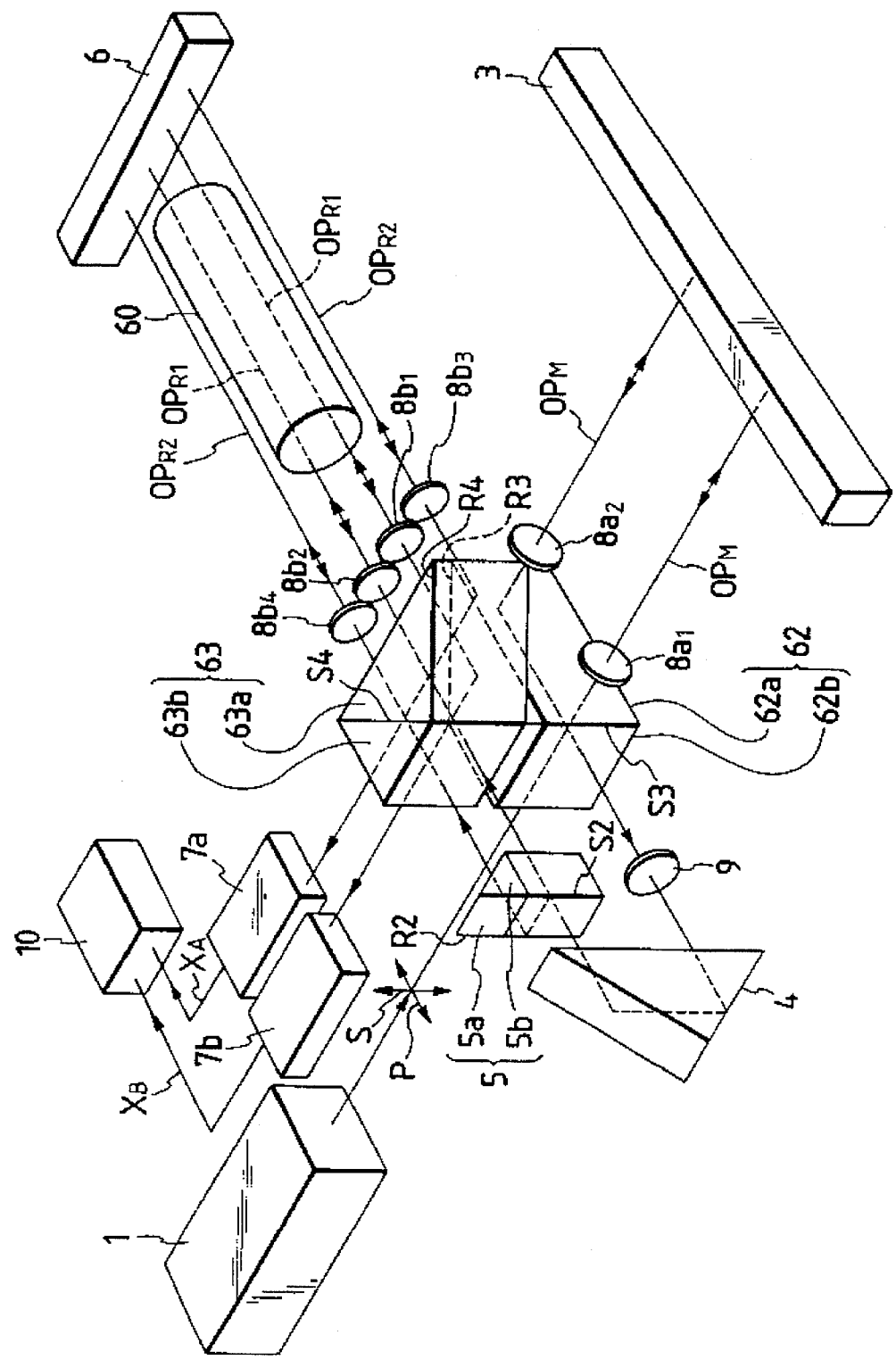
FIG. 13 is a perspective view showing the third embodiment adopting the first principle of the present invention.

Note that the second embodiment shown in FIG. 12 may adopt an arrangement in which the measurement optical path extends perpendicular to the reference optical paths, as shown in FIG. 13. For example, if two polarization prisms 62 and 63 shown in FIG. 13 are used in place of the polarization prism 2 shown in FIG. 12, the measurement optical paths can extend perpendicular to the reference optical paths.

In each of the above-mentioned embodiments, optical path deflection members for bending an optical path may be properly arranged in at least one of the measurement optical path and the reference optical path of each interferometer, and the optical path may be bent to make the apparatus compact as a whole.

In the first to third embodiments described above, the measurement optical path lengths of the first and second interferometers are equal to each other. However, as has been described in the basic principle of the present invention shown in FIGS. 4A and 4B, the measurement optical path lengths of the first and second interferometers may be different from each other, as a matter of course.

In the first to third embodiments described above, the first principle based on the basic principle of the present invention has been exemplified. The arrangement of an interferometer according to the fourth embodiment adopting the second principle based on the basic principle of the present invention will be described below with reference to FIGS. 14A to 14C.

In this embodiment, the conventional interferometer apparatus described above with reference to FIGS. 2A to 2C is improved, and a reference optical path passing through air is formed between each interferometer and each reference reflection unit. Thus, the same reference numerals in FIGS. 14A to 14C denote members having the same functions as in FIGS. 2A to 2C.

Figure 14A:
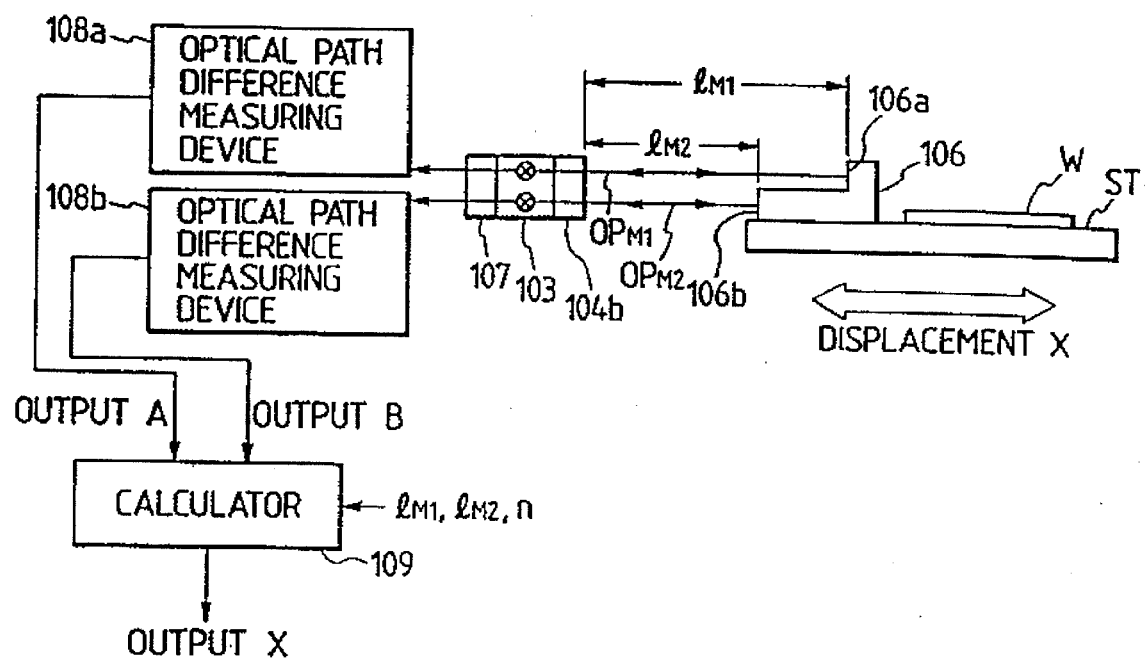
FIG. 14A is a side view showing a state obtained when an interferometer apparatus of the fourth embodiment which adopts the second principle of the present invention is viewed from one side.
Figure 14B:
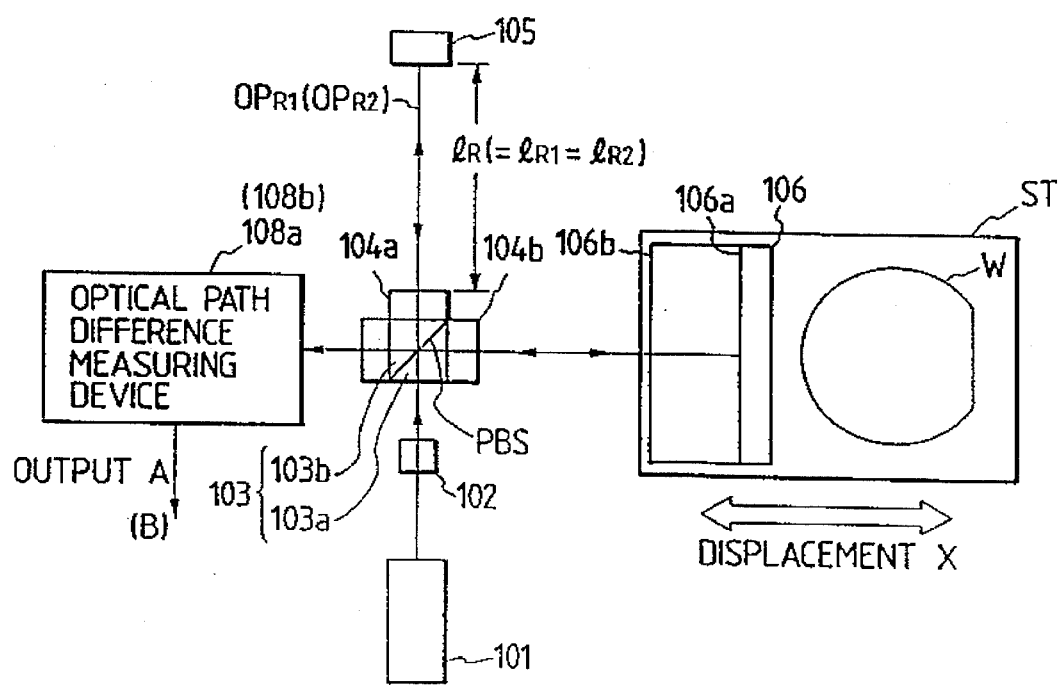
FIG. 14B is a plan view showing a state obtained when the interferometer apparatus of the fourth embodiment shown in FIG. 14A is viewed from the top.
Figure 14C:
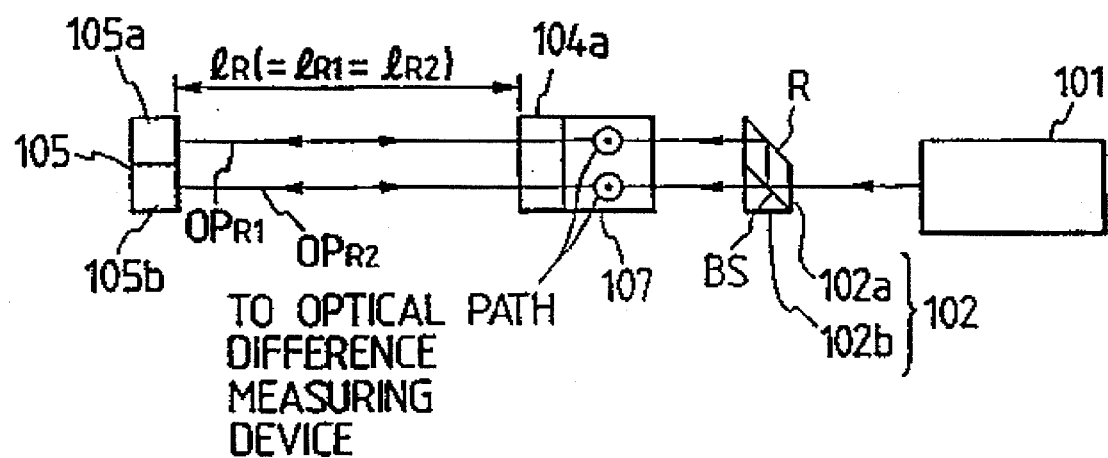
FIG. 14C is a side view showing a state obtained when the interferometer apparatus of the fourth embodiment is viewed from the left side of FIG. 14B.

FIG. 14A shows a state wherein the interferometer apparatus of the fourth embodiment is viewed from its side surface, FIG. 14B shows a state wherein the interferometer apparatus of the fourth embodiment shown in FIG. 14A is viewed from the top, and FIG. 14C shows a state wherein the interferometer apparatus of the fourth embodiment is viewed from the left side of FIG. 14B.

The fourth embodiment shown in FIGS. 14A to 14C comprises: a first measurement reflection units (first movable mirror 106a) and a second measurement reflection unit (second movable mirror 106b) which are arranged at different positions in a measurement direction X, and are integrally movable in the measurement direction X; a first reference reflection unit (first stationary mirror 105a) and a second reference reflection unit (second stationary mirror 105b) which are fixed at equal positions; a light source system (laser source 101, beam splitting prism 102) for supplying coherent light beams; a first interferometer system (polarization splitting prism 103, quarterwave plates 104a and 104b, polarization plate 107, first detecting device 108a) for forming, based on a light beam from the light source system (101, 102), a first measurement optical path $OP_{M1}$ which reciprocates in air along the measurement direction X via the first measurement reflection unit 106a, and a first reference optical path $OP_{R1}$ which reciprocates in air via the first reference reflection unit 105a, and Generating a first measurement output $X_A$ based on light beams obtained via the first measurement optical path $OP_{M1}$ and the first reference optical path $OP_{R1}$; a second interferometer system (polarization splitting prism 103, quarterwave plates 104a and 104b, polarization plate 107, second detecting device 108b) for forming, based on a light beam from the light source system (101, 102), a second measurement optical path $OP_{M2}$ which reciprocates in air along a direction almost parallel to the first measurement optical path $OP_{M1}$ via the second measurement reflection unit (106b), and a second reference optical path $OP_{R2}$ which reciprocates in air via the second reference reflection unit 105b, and generating a second measurement output $X_B$ based on light beams obtained via the second measurement optical path $OP_{M2}$ and the second reference optical path $OP_{R2}$; and a calculator 109 for performing a predetermined calculation based on the first and second measurement outputs ($X_A$, $X_B$).

As shown in FIGS. 14A to 14C, the laser source 101 as a light source for supplying a coherent light beam supplies a beam having a first frequency $f_1$ (to be referred to as a first beam hereinafter), and a beam having a second frequency $f_2$ (to be referred to as a second beam hereinafter). The first and second beams are incident on a beam splitting prism 102. The beam splitting prism 102 is constituted by joining a parallelogrammic prism 102a and a rectangular prism 102b, and a beam splitting surface BS for amplitude-splitting light is formed on the joint surface.

The first and second beams which are reflected by the beam splitting surface BS and propagate toward the first interferometer system will be described below. The first and second beams reflected by the beam splitting surface BS are reflected by a reflection surface R of the prism 102a, and are incident on the upper portion of a polarization splitting prism 103. The polarization splitting prism 103 is constituted by joining two rectangular prisms 103a and 103b, and a polarization splitting surface PBS for polarization-splitting light is formed on the joint surface.

The first beam as one beam incident on the upper portion of the polarization splitting prism 103 is linearly polarized light which oscillates in the plane of incidence of the polarization splitting surface PBS (to be referred to as p-polarized light hereinafter), and the second beam as the other beam is linearly polarized light which oscillates in a plane perpendicular to the plane of incidence of the polarization splitting surface PBS (to be referred to as s-polarized light hereinafter). The first beam (p-polarized light) incident on the polarization splitting surface PBS at an incident angle of 45° is transmitted through the polarization splitting surface PBS, and the second beam (s-polarized light) incident on the polarization splitting surface PBS at an incident angle of 45° is reflected by the polarization splitting surface PBS.

The first beam (p-polarized light) transmitted through the upper portion of the polarization splitting surface PBS will be explained below. The first beam (p-polarized light) transmitted through the polarization splitting surface PBS is then transmitted through a quarterwave plate 104a joined to the polarization splitting prism 103 to be converted into circularly polarized light, and propagates toward an upper first stationary mirror 105a constituting a portion of a reference stationary mirror 105.

The first stationary mirror 105a is arranged to be separated from the quarterwave plate 104a by a predetermined distance $l_{R1}$, so that a gas optical path length (air optical path length) in the first reference optical path $OP_{R1}$ corresponds to a predetermined length $l_{R1}$. As will be described later, the first stationary mirror 105a is constituted integrally with a second stationary mirror 105b arranged below the first stationary mirror 105a.

The first beam (circularly polarized light) reflected by the first stationary mirror 105a is transmitted through the quarterwave plate 104a again to be converted into s-polarized light, and is reflected by the polarization splitting surface PBS in the polarization splitting prism 103. Thereafter, the first beam is incident on a polarization plate 107 joined to the polarization splitting prism 103. The polarization plate 107 is arranged to transmit linearly polarized light in a 45° direction with respect to the direction of s-polarized light as the first beam. Thus, some polarized light components of the first beam are transmitted through the polarization plate 107, and are detected by a first optical path difference detecting device 108a.

The second beam (s-polarized light) reflected by the upper portion of the polarization splitting surface PBS will be explained below. The second beam (s-polarized light) reflected by the polarization splitting surface PBS is transmitted through a quarterwave plate 104b joined to the polarization splitting prism 103 to be converted into circularly polarized light, and then propagates toward an upper first movable mirror 106a which constitutes a portion of a measurement movable mirror 106.

The first movable mirror 106a is arranged to be separated from the quarterwave plate 104b (or the first interferometer) by a predetermined distance $l_{M1}$, so that the air optical path length in the first measurement optical path $OP_{M1}$ corresponds to a predetermined length $l_{M1}$. As will be described later, the first movable mirror 106a is arranged to be movable together with a second movable mirror 106b which is arranged below the first movable mirror 106a to be separated therefrom by a predetermined distance in the measurement direction. Note that the measurement movable mirror 106 is fixed to one end of a stage ST for holding a wafer W, and is moved upon movement of the stage ST.

The second beam (circularly polarized light) reflected by the first movable mirror 106a is transmitted through the quarterwave plate 104b again to be converted into p-polarized light, is transmitted through the polarization splitting surface PBS in the polarization splitting prism 103, and is incident on the polarization plate 107 joined to the polarization splitting prism 103. The polarization plate 107, in other words, is arranged to transmit linearly polarized light in a 45° direction with respect to the direction of p-polarized light as the second beam. Thus, some polarized light components of the second beam are transmitted through the polarization plate 107, and are detected by the first optical path difference detecting device 108a together with some polarized light components of the first beam described above.

The first and second beams which are reflected by the beam splitting surface BS of the beam splitting prism 102 and propagate toward the second interferometer system will be described below. The first and second beams transmitted through the beam splitting surface BS are incident on the lower portion of the polarization splitting prism 103.

As described above, the first beam as one beam incident on the lower portion of the polarization splitting prism 103 is linearly polarized light which oscillates in the plane of incidence of the polarization splitting surface PBS (to be referred to as p-polarized light hereinafter), and the second beam as the other beam is linearly polarized light which oscillates in a plane perpendicular to the plane of incidence of the polarization splitting surface PBS (to be referred to as s-polarized light hereinafter). The first beam (p-polarized light) incident on the polarization splitting surface PBS at an incident angle of 45° is transmitted through the polarization splitting surface PBS, and the second beam (s-polarized light) incident on the polarization splitting surface PBS at an incident angle of 45° is reflected by the polarization splitting surface PBS.

The first beam (p-polarized light) transmitted through the lower portion of the polarization splitting surface PBS will be explained below. The first beam (p-polarized light) transmitted through the polarization splitting surface PBS is transmitted through the quarterwave plate 104a joined to the polarization splitting prism 103 to be converted into circularly polarized light, and propagates toward the lower second stationary mirror 105b constituting another portion of the reference stationary mirror 105.

The second stationary mirror 105b is constituted integrally with the first stationary mirror 105a, and is arranged to be separated from the quarterwave plate 104a (or the second interferometer system) by a predetermined distance $l_{R2}$ ($=l_{R1}$), so that a gas optical path length (air optical path length) in the second reference optical path $OP_{R2}$ corresponds to a predetermined length $l_{R2}$ ($=l_{R1}$) equal to the gas optical path length (air optical path length) in the first reference optical path $OP_{R1}$.

The first beam (circularly polarized light) reflected by the second stationary mirror 105b is transmitted through the quarterwave plate 104a again to be converted into s-polarized light, and is reflected by the polarization splitting surface PBS in the polarization splitting prism 103. Thereafter, the first beam is incident on the polarization plate 107 joined to the polarization splitting prism 103. The polarization plate 107 is arranged to transmit linearly polarized light in a 45° direction with respect to the direction of s-polarized light as the first beam. Thus, some polarized light components of the first beam are transmitted through the polarization plate 107, and are detected by a second optical path difference detecting device 108b.

On the other hand, the second beam (s-polarized light) reflected by the lower portion of the polarization splitting surface PBS will be explained below. The second beam (s-polarized light) reflected by the polarization splitting surface PBS is transmitted through the quarterwave plate 104b joined to the polarization splitting prism 103 to be converted into circularly polarized light, and propagates toward the lower second movable mirror 106b constituting another portion of the measurement movable mirror 106.

The second movable mirror 106b is arranged to be movable together with the first movable mirror 106a upon movement of the stage ST for holding a wafer W. The second movable mirror 106b is arranged to be separated from the quarterwave plate 104b by a predetermined distance $l_{M2}$, so that the air optical path length in the second measurement optical path $OP_{M2}$ corresponds to a predetermined length $l_{M2}$ shorter than the air optical path length in the first measurement optical path $OP_{M1}$.

The second beam (circularly polarized light) reflected by the second movable mirror 106b is transmitted through the quarterwave plate 104b again to be converted into p-polarized light, is transmitted through the polarization splitting surface PBS in the polarization splitting prism 103, and is incident on the polarization plate 107 joined to the polarization splitting prism 103. The polarization plate 107, in other words, is arranged to transmit linearly polarized light in a 45° direction with respect to the direction of p-polarized light as the second beam. Thus, some polarized light components of the second beam are transmitted through the polarization plate 107, and are detected by the second optical path difference detecting device 108b together with some polarized light components of the first beam described above.

As described above, the first optical path difference detecting device 108a receives the first beam via the first reference optical path $OP_{R1}$ having the gas optical path length (air optical path length) $l_{R1}$, and the second beam via the first measurement optical path $OP_{M1}$ having the gas optical path length (air optical path length) $l_{M1}$.

For this reason, an internal photo-electric detector of the first optical path difference detecting device 108a outputs a beat signal having a frequency $(f_1-f_2)$ in a state wherein the first movable mirror 106a stands still relative to the first stationary mirror 105a, and outputs a frequency-modulated beat signal when the first movable mirror 106a moves in the X direction. Therefore, the first optical path difference detecting device 108a can detect a relative moving amount between the first movable mirror 106a and the first stationary mirror 105a by accumulating the change in frequency.

Therefore, the first optical path difference detecting device 108a outputs a signal $X_A$ corresponding to $xn+(l_{M1}-l_R+x)\Delta n$ to a calculator 109, where $l_R$ is the gas optical path length (air optical path length) $l_{R1}$ of the first reference optical path $OP_{R1}$, $l_{M1}$ is the gas optical path length (air optical path length) of the first measurement optical path $OP_{M1}$, n is the refractive index of the gas such as air in an initial state such as a state at the beginning of measurement (upon resetting), $\Delta n$ is the change in refractive index of the gas such as air, and x is the displacement amount of the first movable mirror 106a (or the stage ST) from a reset position (coordinate origin), which represents the position of the first movable mirror 106a (or the stage ST) when the gas optical path length (air optical path length) of the first measurement optical path $OP_{M1}$ becomes $l_{M1}$.

On the other hand, the second optical path difference detecting device 108b receives the first beam via the second reference optical path $OP_{R2}$ having the gas optical path length (air optical path length) $l_{R2}$, and the second beam via the second measurement optical path $OP_{M2}$ having the gas optical path length (air optical path length) $l_{M2}$.

For this reason, an internal photo-electric detector of the second optical path difference detecting device 108b outputs a beat signal having a frequency $(f_1-f_2)$ in a state wherein the second movable mirror 106b stands still relative to the second stationary mirror 105b, and outputs a frequency-modulated beat signal when the second movable mirror 106b moves in the X direction. Therefore, the second optical path difference detecting device 108b can detect a relative moving amount between the second movable mirror 106b and the second stationary mirror 105b by accumulating the change in frequency.

Therefore, the second optical path difference detecting device 108b outputs a signal $X_B$ corresponding to $xn+(l_{M2}-l_R+x)\Delta n$ to the calculator 109, where $l_R$ is the gas optical path length (air optical path length) $l_{R2}$ $(=l_{R1})$ of the second reference optical path $OP_{R2}$, $l_{M2}$ is the gas optical path length (air optical path length) of the second measurement optical path $OP_{M2}$, n is the refractive index of the gas such as air in an initial state such as a state at the beginning of measurement (upon resetting), $\Delta n$ is the change in refractive index of the gas such as air, and x is the displacement amount of the second movable mirror 106b (or the stage ST) from a reset position (coordinate origin), which represents the position of the second movable mirror 106b (or the stage ST) when the gas optical path length (air optical path length) of the second measurement optical path $OP_{M2}$ becomes In the calculator 109, a predetermined formula is memorized, for example, formula (51) below is memorized:

$$x = \frac{-(l_{M2} - l_R)X_A + (l_{M1} - l_R)X_B}{n(l_{M1} - l_{M2}) + X_A - X_B} \tag{51}$$

Therefore, the calculator 109 executes a calculation given by, e.g., formula (51) above based on the output signals ($X_A$ and $X_B$) from the first and second receivers (107a and 107b) and an output n from a refractive index detector (not shown) for detecting an initial refractive index n of the gas at the beginning of measurement, and calculates the moving amounts or coordinate positions of the first movable mirror 106a and the second movable mirror 106b (or the stage ST) based on the calculation result for which a measurement error caused by a change in refractive index of a gas due to, e.g., a fluctuation of the gas is corrected. Thus, the accurate positions of the first movable mirror 106a and the second movable mirror 106b (or the stage ST) can be obtained. The calculation result of the calculator 109 may be displayed via a display unit (not shown), or the driving amount of a driving system for moving the stage ST may be controlled by a control system based on the information of the moving amounts or coordinate positions calculated by the calculator 109 although neither of these systems is shown.

When the first movable mirror 106a and the second movable mirror 106b (or the stage ST) are moved to satisfy formulas (21) to (24) or formulas (47) to (50), the quantization error e to be added to the output from each interferometer apparatus can be suppressed to ×4 to ×1 or less.

As described above, according to the fourth embodiment, since the measurement optical paths and the reference optical paths are arranged adjacent to each other, a measurement error caused by a change in refractive index of a gas in the measurement optical paths can be corrected, and the moving amount or position of the movable mirror 6 can be detected with high precision.

In addition, according to this embodiment, since the two movable mirrors can be moved to internally divide the distances between themselves and the two movable mirrors, measurement with very high precision can be assured.

In the above-mentioned fourth embodiment, the present invention is applied to a heterodyne type laser interferometer. However, the present invention can be similarly applied to a homodyne type interferometer.

In the fourth embodiment, the gas optical path lengths in the two measurement optical paths have a difference ($l_{M1}-l_{M2}$) therebetween by arranging the different positions. However, the present invention is not limited to this. For example, the positions of the first and second movable mirrors 106a and 106b may coincide with each other, the integrated portion of the first and second interferometer system (the polarization splitting prism 103, the quarterwave plates 104a and 104b, and the polarization plate 107) may be divided into two portions, i.e., an upper portion for the first interferometer system and a lower portion for the second interferometer system, and the two interferometer system may be arranged to be shifted in the measurement direction to form a difference ($l_{M1}-l_{M2}$) between the gas optical path lengths in the two measurement optical paths. Furthermore, the two movable mirrors may be integrally arranged, so that the positions of the first and second movable mirrors 106a and 106b are equal to each other, and a sealed tube whose interior is evacuated and which has a length L extending along the measurement optical path may be arranged in either one of the measurement optical paths, thus forming an optical path difference ($L=|l_{M1}-l_{M2}|$) by the length L of the sealed tube. Note that a medium such as a gas, liquid, solid, or the like having a predetermined refractive index may be sealed in the sealed tube.

In the fourth embodiment, the gas optical path lengths in the two reference optical paths are set to be equal to each other by causing the positions of the first and second stationary mirrors 105a and 105b to coincide with each other. However, the present invention is not limited to this. For example, the first and second stationary mirrors 105a and 105b may be arranged to be shifted from each other by a predetermined distance, the integrated portion of the first and second interferometer system (the polarization splitting prism 103, the quarterwave plates 104a and 104b, and the polarization plate 107) may be divided into two portions, i.e., an upper portion for the first interferometer system and a lower portion for the second interferometer system, and the two interferometer system may be arranged to be shifted from each other by the predetermined distance, thus setting the gas optical path lengths in the two reference optical paths to be equal to each other.

In the above-mentioned fourth embodiment, optical path deflection members for bending an optical path may be properly arranged in at least one of the measurement optical path and the reference optical path of each interferometer system, and the optical path may be bent to make the apparatus compact as a whole.

The present invention is not limited to the above-mentioned embodiments, and various changes and modifications may be made within the spirit and scope of the invention.

What is claimed is:

1. An interferometer apparatus comprising:

first and second measurement reflection units which are arranged to be integrally movable in a measurement direction;

first and second reference reflection units respectively fixed at predetermined positions and a light source system for supplying light beams;

a first interferometer system for forming, based on a light beam from said light source system, a first measurement optical path which reciprocates via said first measurement reflection unit, and a first reference optical path which reciprocates via said first reference reflection unit, and generating a first measurement output based on light beams obtained via the first measurement optical path and the first reference optical path;

a second interferometer system for forming, based on a light beam from said light source system, a second measurement optical path which reciprocates via said second measurement reflection unit, and a second reference optical path which reciprocates via said second reference reflection unit, and generating a second measurement output based on light beams obtained via the second measurement optical path and the second reference optical path; and a calculator for performing, in order to correct an influence of environmental change, a predetermined calculation based on the first and second measurement outputs, wherein a first measurement space, in which said first measurement reflection unit is freely movable, is present on said first measurement optical path, said first measurement space extending to said first interferometer system, and a reference position of said first measurement reflection unit is set within said first measurement space;

a second measurement space, in which said second measurement reflection unit is freely movable, is present on said second measurement optical path, said second measurement space extending to said second interferometer system, and a reference position of said second measurement reflection unit is set within said second measurement space; and a first reference space is present on said first reference optical path between said first interferometer system and said first reference reflection unit, and a second reference space is present on said second reference optical path between said second interferometer system and said second reference reflection unit;

wherein when an optical path length of the first measurement optical path from said first interferometer system to said reference position of said first measurement reflection unit is represented by $l_{M1}$, an optical path length of the second measurement optical path from said second interferometer system to said reference position of said second measurement reflection unit is represented by $l_{M2}$, an optical path length of the first reference optical path from said first interferometer system to said first reference reflection unit is represented by $l_{R1}$, an optical path length of the second reference optical path from said second interferometer system to said second reference reflection unit is represented by $l_{R2}$, and a displacement of each of said first and second measurement reflection units from the reference positions thereof is represented by x, said first and second measurement reflection units are arranged to be movable within at least a range given by the following relation for suppression of the quantization error:

$$l_{R1}-l_{M1} \leq x \leq l_{R2}-l_{M2},$$

wherein said optical path length $l_{M1}$ of the first measurement optical path from said first interferometer system to the reference position of said first measurement reflection unit is substantially equal to said optical path length $l_{M2}$ of the second measurement optical path from said second interferometer system to the reference position of said second measurement reflection unit, and said optical path length $l_{R1}$ of the first reference optical path from said first interferometer system to said first reference reflection unit and said optical path length $l_{R2}$ of the second reference optical path from said second interferometer system to said second reference reflection unit are different from each other.

2. An apparatus according to claim 1, wherein said first and second measurement reflection units are integrally arranged, and said first and second interferometer systems are arranged to coaxially pass the first and second measurement optical paths.

3. An interferometer apparatus according to claim 1, wherein said first reference reflection unit comprises a first reference reflection member and said second reference reflection unit comprises a second reference reflection member, and wherein at least one of said first and second reference reflection units has a light-transmissive member having a predetermined refractive index for differentiating optical path lengths of said first reference optical path and said second reference optical path.

4. An apparatus according to claim 3, wherein an interior of said optical member is evacuated to have a refractive index of substantially one.

5. An apparatus according to claim 3, wherein said optical member is tubular and has a medium having a predetermined refractive index therein.

6. An apparatus according to claim 1, wherein the first and second measurement optical paths are arranged to be adjacent to and parallel to each other.

7. An apparatus according to claim 6, wherein the first and second reference optical paths are arranged to be adjacent to and parallel to each other.

8. An apparatus according to claim 1, wherein the first and second reference optical paths are arranged to be adjacent to and parallel to each other.

9. An interferometer apparatus comprising:

first and second measurement reflection units which are arranged to be integrally movable in a measurement direction;

first and second reference reflection units respectively fixed at predetermined positions and a light source system for supplying light beams;

a first interferometer system for forming, based on a light beam from said light source system, a first measurement optical path which reciprocates via said first measurement reflection unit, and a first reference optical path which reciprocates via said first reference reflection unit, and generating a first measurement output based on light beams obtained via the first measurement optical path and the first reference optical path;

a second interferometer system for forming, based on a light beam from said light source system, a second measurement optical path which reciprocates via said second measurement reflection unit, and a second reference optical path which reciprocates via said second reference reflection unit, and generating a second measurement output based on light beams obtained via the second measurement optical path and the second reference optical path; and a calculator for performing, in order to correct an influence of environmental change, a predetermined calculation based on the first and second measurement outputs, wherein a first measurement space, in which said first measurement reflection unit is freely movable, is present on said first measurement optical path, said first measurement space extending to said first interferometer system, and a reference position of said first measurement reflection unit is set within said first measurement space;

a second measurement space, in which said second measurement reflection unit is freely movable, is present on said second measurement optical path, said second measurement space extending to said second interferometer system, and a reference position of said second measurement reflection unit is set within said second measurement space; and a first reference space is present on said first reference optical path between said first interferometer system and said first reference reflection unit, and a second reference space is present on said second reference optical path between said second interferometer system and said second reference reflection unit;

wherein when an optical path length of the first measurement optical path from said first interferometer system to said reference position of said first measurement reflection unit is represented by $l_{M1}$, an optical path length of the second measurement optical path from said second interferometer system to said reference position of said second measurement reflection unit is represented by $l_{M2}$, an optical path length of the first reference optical path from said first interferometer system to said first reference reflection unit is represented by $l_{R1}$, an optical path length of the second reference optical path from said second interferometer system to said second reference reflection unit is represented by $l_{R2}$, and a displacement of each of said first and second measurement reflection units from the reference positions thereof is represented by x, said first and second measurement reflection units are arranged to be movable within at least a range given by the following relation for suppression of the quantization error:

$$\frac{-5(l_{M1} - l_{R1}) + 3(l_{M2} - l_{R2})}{2} \leq x \leq \frac{3(l_{M1} - l_{R1}) - 5(l_{M2} - l_{R2})}{2}$$

wherein said optical path length $l_{M1}$ of the first measurement optical path from said first interferometer system to the reference position of said first measurement reflection unit is substantially equal to said optical path length $l_{M2}$ of the second measurement optical path from said second interferometer system to the reference position of said second measurement reflection unit, and said optical path length $l_{R1}$ of the first reference optical path from said first interferometer system to said first reference reflection unit and said optical path length $l_{R2}$ of the second reference optical path from said second interferometer system to said second reference reflection unit are different from each other.

10. An interferometer apparatus comprising:

first and second measurement reflection units which are arranged to be integrally movable in a measurement direction;

first and second reference reflection units respectively fixed at predetermined positions and a light source system for supplying light beams;

a first interferometer system for forming, based on a light beam from said light source system, a first measurement optical path which reciprocates via said first measurement reflection unit, and a first reference optical path which reciprocates via said first reference reflection unit, and generating a first measurement output based on light beams obtained via the first measurement optical path and the first reference optical path;

a second interferometer system for forming, based on a light beam from said light source system, a second measurement optical path which reciprocates via said second measurement reflection unit, and a second reference optical path which reciprocates via said second reference reflection unit, and generating a second measurement output based on light beams obtained via the second measurement optical path and the second reference optical path; and a calculator for performing, in order to correct an influence of environmental change, a predetermined calculation based on the first and second measurement outputs, wherein a first measurement space, in which said first measurement reflection unit is freely movable, is present on said first measurement optical path, said first measurement space extending to said first interferometer system, and a reference position of said first measurement reflection unit is set within said first measurement space;

a second measurement space, in which said second measurement reflection unit is freely movable, is present on said second measurement optical path, said second measurement space extending to said second interferometer system, and a reference position of said second measurement reflection unit is set within said second measurement space; and a first reference space is present on said first reference optical path between said first interferometer system and said first reference reflection unit, and a second reference space is present on said second reference optical path between said second interferometer system and said second reference reflection unit;

wherein when an optical path length of the first measurement optical path from said first interferometer system to said reference position of said first measurement reflection unit is represented by $l_{M1}$, an optical path length of the second measurement optical path from said second interferometer system to said reference position of said second measurement reflection unit is represented by $l_{M2}$, an optical path length of the first reference optical path from said first interferometer system to said first reference reflection unit is represented by $l_{R1}$, an optical path length of the second reference optical path from said second interferometer system to said second reference reflection unit is represented by $l_{R2}$, and a displacement of each of said first and second measurement reflection units from the reference positions thereof is represented by x, said first and second measurement reflection units are arranged to be movable within at least a range given by the following relation for suppression of the quantization error:

$$-2(l_{M1}-l_{R1})+l_{M2}-l_{R2} \leq x \leq l_{M1}-l_{R1}-2(l_{M2}-l_{R2}),$$

wherein said optical path length $l_{M1}$ of the first measurement optical path from said first interferometer system to the reference position of said first measurement reflection unit is substantially equal to said optical path length $l_{M2}$ of the second measurement optical path from said second interferometer system to the reference position of said second measurement reflection unit, and said optical path length $l_{R1}$ of the first reference optical path from said first interferometer system to said first reference reflection unit and said optical path length $l_{R2}$ of the second reference optical path from said second interferometer system to said second reference reflection unit are different from each other.

11. An interferometer apparatus comprising:

first and second measurement reflection units which are arranged to be integrally movable in a measurement direction;

first and second reference reflection units respectively fixed at predetermined positions and a light source system for supplying light beams;

a first interferometer system for forming, based on a light beam from said light source system, a first measurement optical path which reciprocates via said first measurement reflection unit, and a first reference optical path which reciprocates via said first reference reflection unit, and a first reference optical path which reciprocates via said first reference reflection unit, and generating a first measurement output based on light beams obtained via the first measurement optical path and the first reference optical path;

a second interferometer system for forming, based on a light beam from said light source system, a second measurement optical path which reciprocates via said second measurement reflection unit, and a second reference optical path which reciprocates via said second reference reflection unit, and generating a second measurement output based on light beams obtained via the second measurement optical path and the second reference optical path; and a calculator for performing, in order to correct an influence of environmental change, a predetermined calculation based on the first and second measurement outputs, wherein a first measurement space, in which said first measurement reflection unit is freely movable, is present on said first measurement optical path, said first measurement space extending to said first interferometer system, and a reference position of said first measurement reflection unit is set within said first measurement space;

a second measurement space, in which said second measurement reflection unit is freely movable, is present on said second measurement optical path, said second measurement space extending to said second interferometer system, and a reference position of said second measurement reflection unit is set within said second measurement space; and a first reference space is present on said first reference optical path between said first interferometer system and said first reference reflection unit, and a second reference space is present on said second reference optical path between said second interferometer system and said second reference reflection unit;

wherein when an optical path length of the first measurement optical path from said first interferometer system to said reference position of said first measurement reflection unit is represented by $l_{M1}$, an optical path length of the second measurement optical path from said second interferometer system to said reference position of said second measurement reflection unit is represented by $l_{M2}$, an optical path length of the first reference optical path from said first interferometer system to said first reference reflection unit is represented by $l_{R1}$, an optical path length of the second reference optical path from said second interferometer system to said second reference reflection unit is represented by $l_{R2}$, and a displacement of each of said first and second measurement reflection units from the reference positions thereof is represented by x, said first and second measurement reflection units are arranged to be movable within at least a range given by the following relation for suppression of the quantization error:

$$\frac{-3(l_{M1} - l_{R1}) + l_{M2} - l_{R2}}{2} \leq x \leq \frac{l_{M1} - l_{R1} - 3(l_{M2} - l_{R2})}{2},$$

wherein said optical path length $l_{M1}$ of the first measurement optical path from said first interferometer system to the reference position of said first measurement reflection unit is substantially equal to said optical path length $l_{M2}$ of the second measurement optical path from said second interferometer system to the reference position of said second measurement reflection unit, and said optical path length $l_{R1}$ of the first reference optical path from said first interferometer system to said first reference reflection unit and said optical path length $l_{R2}$ of the second reference optical path from said second interferometer system to said second reference reflection unit are different from each other.

12. An interferometer apparatus comprising:

first and second measurement reflection units which are arranged to be integrally movable in a measurement direction;

first and second reference reflection units respectively fixed at predetermined positions and a light source system for supplying light beams;

a first interferometer system for forming, based on a light beam from said light source system, a first measurement optical path which reciprocates via said first measurement reflection unit, and a first reference optical path which reciprocates via said first reference reflection unit, and generating a first measurement output based on light beams obtained via the first measurement optical path and the first reference optical path;

a second interferometer system for forming, based on a light beam from said light source system, a second measurement optical path which reciprocates via said second measurement reflection unit, and a second reference optical path which reciprocates via said second reference reflection unit, and generating a second measurement output based on light beams obtained via the second measurement optical path and the second reference optical path; and a calculator for performing, in order to correct an influence of environmental change, a predetermined calculation based on the first and second measurement outputs, wherein a first measurement space, in which said first measurement reflection unit is freely movable, is present on said first measurement optical path, said first measurement space extending to said first interferometer system, and a reference position of said first measurement reflection unit is set within said first measurement space;

a second measurement space, in which said second measurement reflection unit is freely movable, is present on said second measurement optical path, said second measurement space extending to said second interferometer system, and a reference position of said second measurement reflection unit is set within said second measurement space; and a first reference space is present on said first reference optical path between said first interferometer system and said first reference reflection unit, and a second reference space is present on said second reference optical path between said second interferometer system and said second reference reflection unit;

wherein an optical path length of the first measurement optical path from said first interferometer system to the reference position of said first measurement reflection unit is substantially equal to an optical path length of the second measurement optical path from said second interferometer system to the reference position of said second measurement reflection unit, and an optical path length of the first reference optical path from said first interferometer system to said first reference reflection unit and an optical path length of the second reference optical path from said second interferometer system to said second reference reflection unit are different from each other.

* * * * *